US012244886B2

(12) United States Patent
Rodriguez et al.

(10) Patent No.: US 12,244,886 B2
(45) Date of Patent: Mar. 4, 2025

(54) PROVIDING VISUAL GUIDANCE FOR PRESENTING VISUAL CONTENT IN A VENUE

(71) Applicant: Sphere Entertainment Group, LLC, New York, NY (US)

(72) Inventors: David E. Rodriguez, Harrison, NJ (US); Michael Ramaszewicz, New York, NY (US); Evan Schectman, New York, NY (US); Michael Graae, New York, NY (US); Clay Budin, Brooklyn, NY (US); Mateusz Marcinowski, San Francisco, CA (US)

(73) Assignee: Sphere Entertainment Group, LLC, New York, NY (US)

( * ) Notice: Subject to any disclaimer, the term of this patent is extended or adjusted under 35 U.S.C. 154(b) by 0 days.

(21) Appl. No.: 18/296,057

(22) Filed: Apr. 5, 2023

(65) Prior Publication Data

US 2023/0239528 A1    Jul. 27, 2023

Related U.S. Application Data

(63) Continuation of application No. 17/234,091, filed on Apr. 19, 2021, now Pat. No. 11,647,244, which is a
(Continued)

(51) Int. Cl.
*H04N 21/414*    (2011.01)
*G06F 3/14*    (2006.01)
(Continued)

(52) U.S. Cl.
CPC ..... *H04N 21/41415* (2013.01); *G06F 3/1423* (2013.01); *G06N 20/00* (2019.01);
(Continued)

(58) Field of Classification Search
CPC ......... H04N 21/41415; H04N 21/2143; H04N 21/25841; H04N 21/8146; G06N 20/00; G06V 20/20; G06V 10/40; G06F 3/1423
See application file for complete search history.

(56) References Cited

U.S. PATENT DOCUMENTS 5,850,352 A    12/1998 Moezzi et al.
8,325,230 B1    12/2012 Pattikonda et al.
(Continued)

*Primary Examiner* — Charles L Beard
(74) *Attorney, Agent, or Firm* — Sterne, Kessler, Goldstein & Fox P.L.L.C.

(57) ABSTRACT

Systems, methods, and computer program products can provide visual guidance on presenting content on a media surface of a venue. These systems, methods, and computer program products can operate by mapping visual content onto a media surface of the venue and a key feature unique to the visual content and/or the media surface being extracted. Thereafter, these systems, methods, and computer program products can retrieve an experiment metric corresponding to the visual content and/or the media surface and can determine a viewer location metric and/or a media surface metric based on the experiment metric and the key feature. These systems, methods, and computer program products can utilize the viewer location metric and/or the media surface metric to provide a hint of the attribute to a user.

20 Claims, 19 Drawing Sheets

Related U.S. Application Data continuation of application No. 16/678,804, filed on Nov. 8, 2019, now Pat. No. 11,023,729.

(51) Int. Cl.
| | |
|---|---|
| *G06N 20/00* | (2019.01) |
| *G06V 10/40* | (2022.01) |
| *G06V 20/20* | (2022.01) |
| *H04N 21/214* | (2011.01) |
| *H04N 21/258* | (2011.01) |
| *H04N 21/81* | (2011.01) |

(52) U.S. Cl.
CPC .............. *G06V 10/40* (2022.01); *G06V 20/20* (2022.01); *H04N 21/2143* (2013.01); *H04N 21/25841* (2013.01); *H04N 21/8146* (2013.01)

(56) References Cited

U.S. PATENT DOCUMENTS

| | | | |
|---|---|---|---|
| 8,427,510 B1 | 4/2013 | Towfiq et al. | |
| 8,487,959 B1 | 7/2013 | Khan et al. | |
| 8,527,340 B2 | 9/2013 | Fisher et al. | |
| 8,549,574 B2 | 10/2013 | Perlman et al. | |
| 8,648,857 B2 | 2/2014 | Williams | |
| 8,693,848 B1 | 4/2014 | Pacor et al. | |
| 8,732,033 B2 | 5/2014 | Brett | |
| 9,239,992 B2 | 1/2016 | Valentino | |
| 9,264,598 B1 | 2/2016 | Baldwin | |
| 9,286,580 B2* | 3/2016 | Itoh | G06Q 30/06 |
| 9,329,469 B2 | 5/2016 | Benko et al. | |
| 9,480,907 B2 | 11/2016 | Benko et al. | |
| 9,503,687 B2 | 11/2016 | Kratz et al. | |
| 9,609,383 B1 | 3/2017 | Hirst | |
| 9,654,818 B2 | 5/2017 | Kuncl et al. | |
| 9,787,958 B2* | 10/2017 | Hattingh | G06T 3/005 |
| 9,797,151 B2 | 10/2017 | Sallent Puigcercos | |
| 9,838,675 B2 | 12/2017 | Gocke et al. | |
| 9,842,268 B1 | 12/2017 | Krafka et al. | |
| 10,063,820 B2 | 8/2018 | Bert et al. | |
| 10,063,822 B2 | 8/2018 | Hattingh et al. | |
| 10,076,711 B2 | 9/2018 | Malenfant | |
| 10,078,917 B1 | 9/2018 | Gaeta et al. | |
| 10,096,085 B2 | 10/2018 | Kim et al. | |
| 10,110,850 B1 | 10/2018 | Pantofaru et al. | |
| 10,156,898 B2 | 12/2018 | Prosserman et al. | |
| 10,165,326 B1 | 12/2018 | Kline et al. | |
| 10,204,444 B2 | 2/2019 | Khalid et al. | |
| 10,206,001 B2 | 2/2019 | Kline et al. | |
| 10,242,714 B2* | 3/2019 | Roy | H04N 21/440218 |
| 10,244,200 B2* | 3/2019 | Wozniak | H04N 19/136 |
| 10,244,215 B2* | 3/2019 | Wozniak | H04N 19/597 |
| 10,257,490 B2 | 4/2019 | Khalid et al. | |
| 10,281,979 B2 | 5/2019 | Oyama | |
| 10,296,281 B2 | 5/2019 | Prosserman et al. | |
| 10,325,410 B1 | 6/2019 | Smith et al. | |
| 10,343,015 B2 | 7/2019 | Marty et al. | |
| 10,362,290 B2* | 7/2019 | Cole | H04N 13/139 |
| 10,380,798 B2 | 8/2019 | He et al. | |
| 10,397,656 B2 | 8/2019 | Kline et al. | |
| 10,412,382 B2* | 9/2019 | Cole | G02B 27/0172 |
| 10,416,757 B2* | 9/2019 | Smit | G06F 3/012 |
| 10,419,788 B2* | 9/2019 | Arimilli | H04N 21/21805 |
| 10,478,730 B1 | 11/2019 | Burnett | |
| 10,503,457 B2 | 12/2019 | Dimitrov et al. | |
| 10,514,262 B2 | 12/2019 | Oxenham et al. | |
| 10,559,060 B2 | 2/2020 | Noh et al. | |
| 10,613,699 B2* | 4/2020 | Thompson | G06F 3/011 |
| 10,621,784 B2 | 4/2020 | Khan et al. | |
| 10,664,225 B2 | 5/2020 | Prosserman et al. | |
| 10,666,863 B2* | 5/2020 | Wozniak | H04N 21/816 |
| 10,667,012 B2 | 5/2020 | Kline et al. | |
| 10,713,543 B1 | 7/2020 | Skuin et al. | |
| 10,719,987 B1* | 7/2020 | Tanumihardja | H04N 5/765 |
| 10,733,774 B2 | 8/2020 | Bae et al. | |
| 10,748,008 B2 | 8/2020 | Chang et al. | |
| 10,764,494 B2* | 9/2020 | Wozniak | H04N 21/6587 |
| 10,769,446 B2 | 9/2020 | Chang et al. | |
| 10,789,920 B1* | 9/2020 | Dolder | G10H 1/0066 |
| 10,810,791 B2 | 10/2020 | Khalid et al. | |
| 10,819,967 B2 | 10/2020 | Khalid et al. | |
| 10,951,877 B2* | 3/2021 | Ragan | G06F 3/1423 |
| 11,023,729 B1 | 6/2021 | Rodriguez et al. | |
| 11,080,923 B2* | 8/2021 | Kaminski | G06T 15/08 |
| 11,138,784 B2* | 10/2021 | Sugano | G06T 15/20 |
| 11,153,492 B2* | 10/2021 | Hutsler | G06V 20/40 |
| 11,176,746 B2* | 11/2021 | Romaszewicz | G02B 27/0101 |
| 11,272,153 B2* | 3/2022 | Shikata | G06T 7/70 |
| 11,593,771 B2* | 2/2023 | Badigannavar | G06Q 30/0208 |
| 11,830,249 B2* | 11/2023 | Neumann | G06N 20/00 |
| 12,086,301 B2* | 9/2024 | Spears | G06T 19/20 |
| 2002/0082879 A1 | 6/2002 | Miller | G06Q 30/02 705/5 |
| 2002/0159035 A1 | 10/2002 | Koyama et al. | |
| 2003/0038892 A1* | 2/2003 | Wang | H04N 21/2187 348/E5.022 |
| 2003/0069829 A1* | 4/2003 | Gathman | G06Q 40/04 705/37 |
| 2004/0146840 A1 | 7/2004 | Hoover et al. | |
| 2004/0218918 A1 | 11/2004 | Gluck | |
| 2006/0038814 A1 | 2/2006 | Rivera | |
| 2007/0047949 A1 | 3/2007 | Gluck | |
| 2007/0121534 A1 | 5/2007 | James et al. | |
| 2007/0265892 A1 | 11/2007 | Valentino | |
| 2008/0103934 A1* | 5/2008 | Gibson | G06Q 30/0643 705/5 |
| 2008/0129825 A1* | 6/2008 | DeAngelis | H04N 23/661 348/E7.086 |
| 2008/0246694 A1 | 10/2008 | Fischer | |
| 2008/0249895 A1 | 10/2008 | Mariotti | |
| 2008/0255889 A1* | 10/2008 | Geisler | G06Q 10/02 705/14.1 |
| 2008/0268961 A1 | 10/2008 | Brook et al. | |
| 2008/0281644 A1 | 11/2008 | Payne | |
| 2009/0063206 A1 | 3/2009 | Payne et al. | |
| 2009/0091711 A1* | 4/2009 | Rivera | G06T 3/00 705/18 |
| 2009/0128554 A1* | 5/2009 | Elsberg | G06T 15/20 345/419 |
| 2009/0256839 A1* | 10/2009 | Bastian | G06T 19/00 705/26.1 |
| 2010/0010840 A1 | 1/2010 | Eden | |
| 2010/0037273 A1 | 2/2010 | Dressel et al. | |
| 2010/0073468 A1* | 3/2010 | Kutner | G03B 37/00 726/26 |
| 2010/0121808 A1 | 5/2010 | Kuhn | |
| 2010/0128112 A1* | 5/2010 | Marti | G06F 3/011 348/E13.001 |
| 2010/0133339 A1 | 6/2010 | Gibson et al. | |
| 2010/0138874 A1* | 6/2010 | Deutschman | G06Q 10/02 725/60 |
| 2010/0195623 A1 | 8/2010 | Narasimhan et al. | |
| 2010/0201878 A1* | 8/2010 | Barenbrug | H04N 21/4316 348/563 |
| 2010/0251173 A1 | 9/2010 | Imanishi | |
| 2010/0328346 A1* | 12/2010 | Watson | G06F 3/1446 345/649 |
| 2010/0328447 A1* | 12/2010 | Watson | H04N 7/183 345/1.3 |
| 2011/0013087 A1 | 1/2011 | House et al. | |
| 2011/0099092 A1* | 4/2011 | Gibson | G06Q 30/0643 705/27.1 |
| 2011/0115930 A1 | 5/2011 | Kulinets et al. | |
| 2011/0243546 A1 | 10/2011 | Pace et al. | |
| 2012/0050698 A1* | 3/2012 | Kotani | H04N 9/3147 353/94 |
| 2012/0078667 A1* | 3/2012 | Denker | G06Q 10/02 705/5 |
| 2012/0090005 A1 | 4/2012 | Marlow et al. | |
| 2012/0159329 A1 | 6/2012 | Chow et al. | |
| 2012/0166960 A1* | 6/2012 | Salles | G06Q 10/02 715/738 |

(56) References Cited

U.S. PATENT DOCUMENTS

| | | |
|---|---|---|
| 2012/0173310 A1 | 7/2012 | Groetzinger et al. |
| 2012/0226575 A1 | 9/2012 | Goldberg et al. |
| 2012/0233000 A1* | 9/2012 | Fisher ................. G06F 16/58 |
| | | 705/14.71 |
| 2012/0319997 A1* | 12/2012 | Majumder .............. G06F 3/017 |
| | | 345/175 |
| 2012/0320169 A1* | 12/2012 | Bathiche ............ G02B 27/017 |
| | | 348/53 |
| 2012/0323612 A1 | 12/2012 | Callaghan |
| 2013/0080922 A1 | 3/2013 | Elias et al. |
| 2013/0083173 A1 | 4/2013 | Geisner et al. |
| 2013/0141588 A1 | 6/2013 | Crookham et al. |
| 2013/0159030 A1 | 6/2013 | Tattenbaum et al. |
| 2013/0222557 A1* | 8/2013 | Kuo ..................... G02B 30/24 |
| | | 348/54 |
| 2013/0267319 A1 | 10/2013 | Kuhn et al. |
| 2013/0268899 A1* | 10/2013 | Valentino ............ G06Q 10/02 |
| | | 715/852 |
| 2013/0321400 A1 | 12/2013 | van Os et al. |
| 2013/0321401 A1 | 12/2013 | Piemonte et al. |
| 2013/0335520 A1 | 12/2013 | Campbell et al. |
| 2014/0007017 A1 | 1/2014 | Sternfeld et al. |
| 2014/0013228 A1 | 1/2014 | Hutten |
| 2014/0044340 A1 | 2/2014 | Phan et al. |
| 2014/0066127 A1 | 3/2014 | Naiki et al. |
| 2014/0085203 A1* | 3/2014 | Kobayashi ............. G06F 3/012 |
| | | 345/158 |
| 2014/0095223 A1* | 4/2014 | Oxenham ............ G06Q 10/02 |
| | | 705/5 |
| 2014/0125698 A1* | 5/2014 | Latta .................. A63F 13/65 |
| | | 345/633 |
| 2014/0146080 A1 | 5/2014 | Ivashin et al. |
| 2014/0146177 A1 | 5/2014 | Pacor et al. |
| 2014/0150032 A1 | 5/2014 | Pacor et al. |
| 2014/0150042 A1 | 5/2014 | Pacor et al. |
| 2014/0168277 A1 | 6/2014 | Ashley et al. |
| 2014/0188527 A1* | 7/2014 | Oxenham ............... G08B 5/221 |
| | | 705/5 |
| 2014/0188528 A1* | 7/2014 | Oxenham ......... G06Q 30/0253 |
| | | 705/5 |
| 2014/0195277 A1* | 7/2014 | Kim .................. G08B 5/221 |
| | | 705/5 |
| 2014/0240352 A1 | 8/2014 | Kuncl et al. |
| 2015/0012308 A1* | 1/2015 | Snyder ................. G06Q 10/02 |
| | | 705/5 |
| 2015/0058781 A1 | 2/2015 | Malik et al. |
| 2015/0100354 A1 | 4/2015 | Horowitz et al. |
| 2015/0100869 A1 | 4/2015 | Sunshine et al. |
| 2015/0106134 A1* | 4/2015 | Gandham ............ G06Q 10/02 |
| | | 705/5 |
| 2015/0161525 A1* | 6/2015 | Hirose ................. G06Q 10/02 |
| | | 705/5 |
| 2015/0169142 A1 | 6/2015 | Longo et al. |
| 2015/0169694 A1 | 6/2015 | Longo et al. |
| 2015/0221334 A1 | 8/2015 | King et al. |
| 2015/0222935 A1 | 8/2015 | King et al. |
| 2015/0242947 A1* | 8/2015 | Wilson ................ G06Q 10/02 |
| | | 705/5 |
| 2015/0287119 A1 | 10/2015 | Bhan et al. |
| 2015/0297949 A1 | 10/2015 | Aman et al. |
| 2015/0304601 A1 | 10/2015 | Hicks et al. |
| 2015/0304724 A1 | 10/2015 | Prosserman et al. |
| 2015/0350628 A1* | 12/2015 | Sanders ................. G06F 3/011 |
| | | 345/419 |
| 2015/0379353 A1 | 12/2015 | Mate et al. |
| 2016/0004979 A1 | 1/2016 | Getchius |
| 2016/0014435 A1 | 1/2016 | Cronin et al. |
| 2016/0055550 A1* | 2/2016 | Sundaresan ........ G06Q 30/0282 |
| | | 705/347 |
| 2016/0063103 A1 | 3/2016 | Bostick et al. |
| 2016/0073013 A1* | 3/2016 | Prosserman ........... G11B 27/10 |
| | | 348/588 |
| 2016/0080710 A1* | 3/2016 | Hattingh ................. G06F 3/011 |
| | | 348/745 |
| 2016/0125324 A1* | 5/2016 | Yamamoto ......... G06Q 30/0631 |
| | | 705/5 |
| 2016/0142629 A1* | 5/2016 | Jung ..................... H04N 23/661 |
| | | 348/218.1 |
| 2016/0153208 A1 | 6/2016 | Oehl et al. |
| 2016/0182854 A1* | 6/2016 | Suzuki ............... H04N 21/4223 |
| | | 348/14.07 |
| 2016/0182877 A1 | 6/2016 | Deluca |
| 2016/0189060 A1 | 6/2016 | Ngo et al. |
| 2016/0219338 A1* | 7/2016 | Wang ................. H04N 21/4782 |
| 2016/0225187 A1 | 8/2016 | Knipp et al. |
| 2016/0227190 A1* | 8/2016 | Cole .................... H04N 13/161 |
| 2016/0253601 A1* | 9/2016 | Akpala ................. G06Q 10/02 |
| | | 705/5 |
| 2016/0323559 A1 | 11/2016 | Matsunobu et al. |
| 2016/0350680 A1 | 12/2016 | Sweeney et al. |
| 2016/0360267 A1* | 12/2016 | Marilly ............ H04N 21/44008 |
| 2016/0371886 A1 | 12/2016 | Thompson et al. |
| 2016/0381110 A1 | 12/2016 | Barnett et al. |
| 2016/0381157 A1 | 12/2016 | Magnusson et al. |
| 2017/0011554 A1 | 1/2017 | Burba et al. |
| 2017/0025152 A1 | 1/2017 | Jaime et al. |
| 2017/0026612 A1 | 1/2017 | Rintel et al. |
| 2017/0046635 A1 | 2/2017 | Thomas et al. |
| 2017/0053449 A1 | 2/2017 | Lee et al. |
| 2017/0083835 A1 | 3/2017 | Sunshine et al. |
| 2017/0083836 A1 | 3/2017 | Sunshine et al. |
| 2017/0150218 A1* | 5/2017 | Oobuchi ............. H04N 21/442 |
| 2017/0157512 A1 | 6/2017 | Long et al. |
| 2017/0257576 A1* | 9/2017 | Mitsui .................. H04N 23/63 |
| 2017/0262918 A1* | 9/2017 | Sweeney ........... G06Q 30/0643 |
| 2017/0264936 A1* | 9/2017 | Depies .............. G02B 27/0093 |
| 2017/0264945 A1* | 9/2017 | Depies ............... H04N 21/8133 |
| 2017/0270587 A1* | 9/2017 | Wolfson ................. G06Q 10/02 |
| 2017/0277358 A1 | 9/2017 | Kihara |
| 2017/0287059 A1* | 10/2017 | Shelksohn ......... G06Q 30/0643 |
| 2017/0316606 A1 | 11/2017 | Khalid et al. |
| 2017/0318275 A1 | 11/2017 | Khalid et al. |
| 2017/0354875 A1 | 12/2017 | Marks et al. |
| 2017/0372390 A1* | 12/2017 | Lokesh .................. G06F 16/29 |
| 2018/0005141 A1 | 1/2018 | Vasvani et al. |
| 2018/0039916 A1 | 2/2018 | Ravindra |
| 2018/0052935 A1* | 2/2018 | Vasvani ................ G06F 3/0481 |
| 2018/0060895 A1 | 3/2018 | Sunshine et al. |
| 2018/0075656 A1 | 3/2018 | Kim |
| 2018/0089594 A1 | 3/2018 | Duncker et al. |
| 2018/0136893 A1 | 5/2018 | Mirarchi et al. |
| 2018/0139425 A1 | 5/2018 | Mutter et al. |
| 2018/0165830 A1* | 6/2018 | Danieau ................ G06F 3/012 |
| 2018/0167656 A1 | 6/2018 | Ortiz et al. |
| 2018/0173372 A1 | 6/2018 | Greenspan et al. |
| 2018/0176502 A1 | 6/2018 | Bhuruth et al. |
| 2018/0176520 A1 | 6/2018 | Jang et al. |
| 2018/0189684 A1 | 7/2018 | Vasvani |
| 2018/0191952 A1* | 7/2018 | Ardo ..................... H04N 23/90 |
| 2018/0197119 A1 | 7/2018 | Sunshine et al. |
| 2018/0213192 A1 | 7/2018 | Jang et al. |
| 2018/0225537 A1 | 8/2018 | Cole et al. |
| 2018/0227572 A1 | 8/2018 | King |
| 2018/0227694 A1 | 8/2018 | King |
| 2018/0242178 A1 | 8/2018 | Barton et al. |
| 2018/0289166 A1 | 10/2018 | Andon et al. |
| 2018/0293519 A1 | 10/2018 | Towfiq et al. |
| 2018/0295389 A1* | 10/2018 | Kakurai ............. H04N 21/8146 |
| 2018/0299952 A1 | 10/2018 | Koker et al. |
| 2018/0324410 A1 | 11/2018 | Roine et al. |
| 2018/0343442 A1 | 11/2018 | Yoshikawa et al. |
| 2018/0350136 A1 | 12/2018 | Rowley |
| 2018/0352298 A1 | 12/2018 | Kline et al. |
| 2018/0352300 A1 | 12/2018 | Kline et al. |
| 2018/0352386 A1 | 12/2018 | Gunasekara et al. |
| 2018/0357981 A1 | 12/2018 | Ng et al. |
| 2018/0374192 A1* | 12/2018 | Kunkel ................ H04N 23/58 |
| 2018/0376207 A1 | 12/2018 | Kline et al. |
| 2018/0376217 A1* | 12/2018 | Kahng ............. H04N 21/41407 |
| 2019/0039288 A1 | 2/2019 | Goel et al. |
| 2019/0043218 A1* | 2/2019 | Hiltner .................. H04N 23/60 |

(56) References Cited

U.S. PATENT DOCUMENTS

| | | | |
|---|---|---|---|
| 2019/0099678 A1* | 4/2019 | Khan | A63F 13/44 |
| 2019/0099681 A1 | 4/2019 | Rico et al. | |
| 2019/0102939 A1 | 4/2019 | He et al. | |
| 2019/0102941 A1* | 4/2019 | Khan | G02B 27/017 |
| 2019/0102944 A1 | 4/2019 | Han et al. | |
| 2019/0121522 A1 | 4/2019 | Davis et al. | |
| 2019/0124316 A1 | 4/2019 | Yoshimura | |
| 2019/0139105 A1 | 5/2019 | McGuire et al. | |
| 2019/0146313 A1* | 5/2019 | De La Cruz | G03B 21/142 345/581 |
| 2019/0156565 A1 | 5/2019 | Khalid et al. | |
| 2019/0156690 A1 | 5/2019 | Carrick et al. | |
| 2019/0166339 A1* | 5/2019 | De La Cruz | G06T 5/80 |
| 2019/0182471 A1 | 6/2019 | Khalid et al. | |
| 2019/0199992 A1 | 6/2019 | Shikata et al. | |
| 2019/0209046 A1 | 7/2019 | Addison et al. | |
| 2019/0212901 A1 | 7/2019 | Garrison et al. | |
| 2019/0220665 A1 | 7/2019 | Neumann et al. | |
| 2019/0238861 A1 | 8/2019 | D'Acunto et al. | |
| 2019/0253743 A1 | 8/2019 | Tanaka et al. | |
| 2019/0261052 A1 | 8/2019 | Kline et al. | |
| 2019/0268572 A1 | 8/2019 | Tsukahara et al. | |
| 2019/0272738 A1 | 9/2019 | Hutz et al. | |
| 2019/0289275 A1 | 9/2019 | Arai | |
| 2019/0313119 A1* | 10/2019 | Han | H04N 19/174 |
| 2019/0335166 A1* | 10/2019 | Copley | H04N 13/167 |
| 2019/0354759 A1 | 11/2019 | Somers et al. | |
| 2019/0358547 A1 | 11/2019 | Mack et al. | |
| 2019/0366189 A1* | 12/2019 | Plant | G06F 18/22 |
| 2020/0012293 A1 | 1/2020 | Lee | |
| 2020/0021966 A1 | 1/2020 | Wylie et al. | |
| 2020/0033610 A1 | 1/2020 | Haseltine et al. | |
| 2020/0045275 A1* | 2/2020 | Hsiao | G06T 3/067 |
| 2020/0050884 A1 | 2/2020 | Han et al. | |
| 2020/0074181 A1 | 3/2020 | Chang et al. | |
| 2020/0076523 A1* | 3/2020 | Kline | H04H 60/45 |
| 2020/0099905 A1 | 3/2020 | Post et al. | |
| 2020/0104999 A1 | 4/2020 | Edell et al. | |
| 2020/0120097 A1 | 4/2020 | Amitay et al. | |
| 2020/0137519 A1 | 4/2020 | Dolan | |
| 2020/0162643 A1* | 5/2020 | Park | G06T 3/08 |
| 2020/0167649 A1 | 5/2020 | Tanninen et al. | |
| 2020/0177850 A1 | 6/2020 | Emig et al. | |
| 2020/0226843 A1 | 7/2020 | Khan et al. | |
| 2020/0228767 A1* | 7/2020 | Ichieda | H04N 9/3194 |
| 2020/0234201 A1 | 7/2020 | Dorna et al. | |
| 2020/0241697 A1 | 7/2020 | Ikeda et al. | |
| 2020/0279385 A1 | 9/2020 | Kirk et al. | |
| 2020/0279410 A1 | 9/2020 | Lee et al. | |
| 2020/0289935 A1* | 9/2020 | Azmandian | G06F 3/04815 |
| 2020/0293176 A1* | 9/2020 | Yoganandan | G06F 3/04815 |
| 2020/0302510 A1* | 9/2020 | Chachek | G06Q 30/0639 |
| 2020/0305846 A1* | 10/2020 | Syu | G06T 7/593 |
| 2020/0322754 A1* | 10/2020 | Soule | G06Q 30/0271 |
| 2020/0323065 A1* | 10/2020 | Hultermans | H05B 47/19 |
| 2020/0404241 A1* | 12/2020 | Han | G06T 9/40 |
| 2021/0004730 A1* | 1/2021 | Koslu | G06F 16/906 |
| 2021/0021800 A1* | 1/2021 | Ragan | H04N 13/282 |
| 2021/0027347 A1* | 1/2021 | Schnitzer | G06Q 20/045 |
| 2021/0142058 A1* | 5/2021 | Rodriguez | G06N 7/01 |
| 2021/0158228 A1 | 5/2021 | Shimizu et al. | |
| 2021/0203908 A1* | 7/2021 | Ragan | G09G 3/002 |
| 2021/0240989 A1* | 8/2021 | Rodriguez | G06F 3/1446 |
| 2022/0167176 A1 | 5/2022 | Khalid | |
| 2022/0172127 A1 | 6/2022 | Cui et al. | |
| 2022/0189200 A1 | 6/2022 | Hayashi et al. | |
| 2022/0192561 A1* | 6/2022 | Makino | G06Q 10/02 |
| 2022/0193558 A1 | 6/2022 | Larson et al. | |
| 2022/0277471 A1 | 9/2022 | Ego et al. | |
| 2023/0154290 A1* | 5/2023 | McNelley | H04N 9/3179 463/40 |
| 2023/0171371 A1* | 6/2023 | Miyata | G06T 15/205 348/211.2 |
| 2023/0239528 A1* | 7/2023 | Rodriguez | G06N 7/01 345/419 |
| 2024/0020851 A1* | 1/2024 | Beziaeva | G06F 3/1446 |
| 2024/0022830 A1* | 1/2024 | Beziaeva | G06T 1/20 |
| 2024/0075402 A1* | 3/2024 | O'Connell | H04N 21/4307 |
| 2024/0214535 A1* | 6/2024 | Graae | H04N 5/77 |
| 2024/0214676 A1* | 6/2024 | Dasilva | H04N 9/3182 |
| 2024/0214690 A1* | 6/2024 | Dasilva | H04N 23/661 |

* cited by examiner

PROVIDING VISUAL GUIDANCE FOR PRESENTING VISUAL CONTENT IN A VENUE

CROSS-REFERENCE TO RELATED APPLICATIONS

This application is a continuation of U.S. application Ser. No. 17/234,091, filed Apr. 19, 2021, which is a continuation of U.S. patent application Ser. No. 16/678,804, filed Nov. 8, 2019, now U.S. Pat. No. 11,023,729, each of which is incorporated herein by reference in its entirety.

BACKGROUND

Concerts are traditionally performed in a wide variety of venues throughout the country. The concerts typically entail providing various customized visual renderings on the venue's media surfaces. However, the media surfaces have different configurations depending on the venue, and the visual rendering may also vary depending on the concert. Thus, the venue's media surfaces may not provide a particular concert's visual rendering in its intended fashion. For example, the visual content may not be accurately mapped based on the unique geometry of the venue's media surface, thereby providing viewers with an unintended or non-ideal viewing experience. As such, prior systems are unable to forecast how customized visual renderings may be presented on a particular venue's media surfaces.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing users with a greater visual understanding of the visibility of media surfaces in a venue.

Venues have different configurations of media surfaces for presenting media content (e.g., visual content) and viewer locations (e.g., seats and standing locations) relative to the media surfaces. For example, one venue may have a two-dimensional, straight media surface that is in front of the viewer locations, and another venue may have a three-dimensional, curved media surface that at least partially surrounds all viewer locations. As such, viewers may have different perceptions of media content presented on the media surface depending on a wide variety of factors, such as the location of the media surface in the venue, the degree of curvature of the media surface, the viewer locations in the venue relative to the media surface, the location of objects (e.g., other people, venue architecture, stage and non-stage props, chairs, banners) occluding the field of view of the viewer relative to the media surfaces, the location of objects (e.g., people, buildings, aircraft, vehicles, animals, landscapes, creatures, clouds, and abstract shapes) of the media content on the media surface, and the movement of the visual objects of the media content on the media surface (e.g., left to right, top to bottom, and various angles). Moreover, some or all of these factors may have different and/or unknown effects on the presentation of media content on the media surface of the venue. For example, viewers (e.g., located directly in front of the media surface) may receive an appropriate and intended perspective of the media content, whereas other viewers (e.g., located to the left, right, above, or below) may have different and unintended perspectives of the media content.

Accordingly, the present disclosure is directed to an application that permits users to acquire a visual understanding of the visibility of media content rendered on the media surface of venue for all possible vantage points in the venue. The application performs an experiment with representative media content and the venue's media surfaces to derive the necessary data points for determining an attribute of future media content (e.g., content to be utilized in a concert). The application then performs an analysis of the future media content and/or the venue's media surface based on the derived data points to determine an attribute of the future media content with respect to the venue's media surface. The experiments and analyses may be rerun to determine different attributes. The application thereafter provides visual guidance to the user. In some embodiments, the visual guidance may be a heat map of the attribute.

Figure 1:
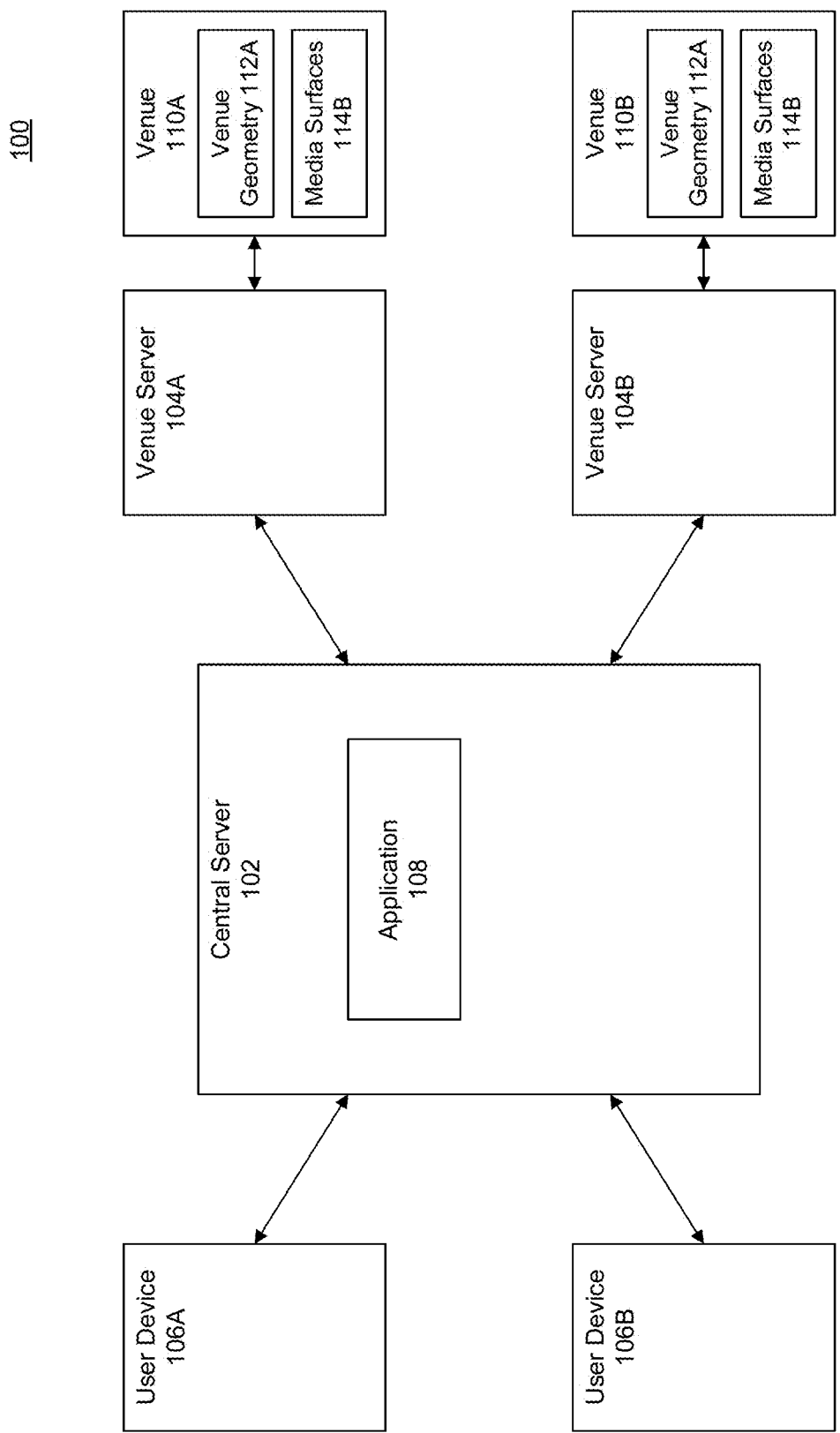
FIG. 1 illustrates a block diagram of an example system for providing visual guidance on presenting content on a media surface of a venue, according to some embodiments.

FIG. 1 illustrates a block diagram of an example system for providing visual guidance on presenting content on a media surface of a venue, according to some embodiments. The system 100 includes a central server 102, one or more local servers 104A-B, and one or more user devices 106A-B. Central server 102 is in communication with local servers 104A-B and user devices 106A-B. In some embodiments, central server 102 may host application 108, which permits users at user devices 106A-B to perform experiments and analyses to derive visual guidance for presenting media content on media surfaces of venue. The experiments and analyses may be performed on or with respect to, venue geometry 112A-B and media surface 114A-B of venues. Accordingly, central server 102 may perform the associated processing and relay the necessary data to the venue servers 104A-B and/or user devices 106A-B. In some embodiments, although not illustrated and as discussed below, venue server 104A-B and/or user devices 106A-B may host application 108 and perform the associated processing locally.

Local servers 104A-B manage the presentation of media content on media surfaces 114A-B of venues 110A-B. As such, venues 110A-B may have a unique configuration of venue geometry 112A-B and media surfaces 114A-B. Venue geometry 112A-B includes structure and/or viewer locations (e.g., seats and locations) within the venue that define the viewer's perspective within the venue 110A-B and in the venue. For example, venue geometry 112A-B may include floors, ceilings, walls, stages, trussing, and any stage elements or other objects that may impede or block the view of the media. Venue geometry 112A-B may thus be two- or three-dimensional points (UV or XYZ) in the venue. For example, venue geometry 112-B may contain three-dimensional polygons or three-dimensional surfaces.

Moreover, media surfaces 114A-B represent one or more surfaces that can be provided with media content. For example, media surfaces 114A-B represent one or more display surfaces in the venue where content can be shown to viewers. As such, media surfaces 114A-B may be a monitor, a television, and/or a screen. Moreover, media surfaces 114A-B may be in front of the viewers. Along these lines, media surfaces 114A-B may be curved and at least partially surround the viewer locations. Accordingly, media surfaces 114A-B may be two- or three dimensional.

Figure 2:
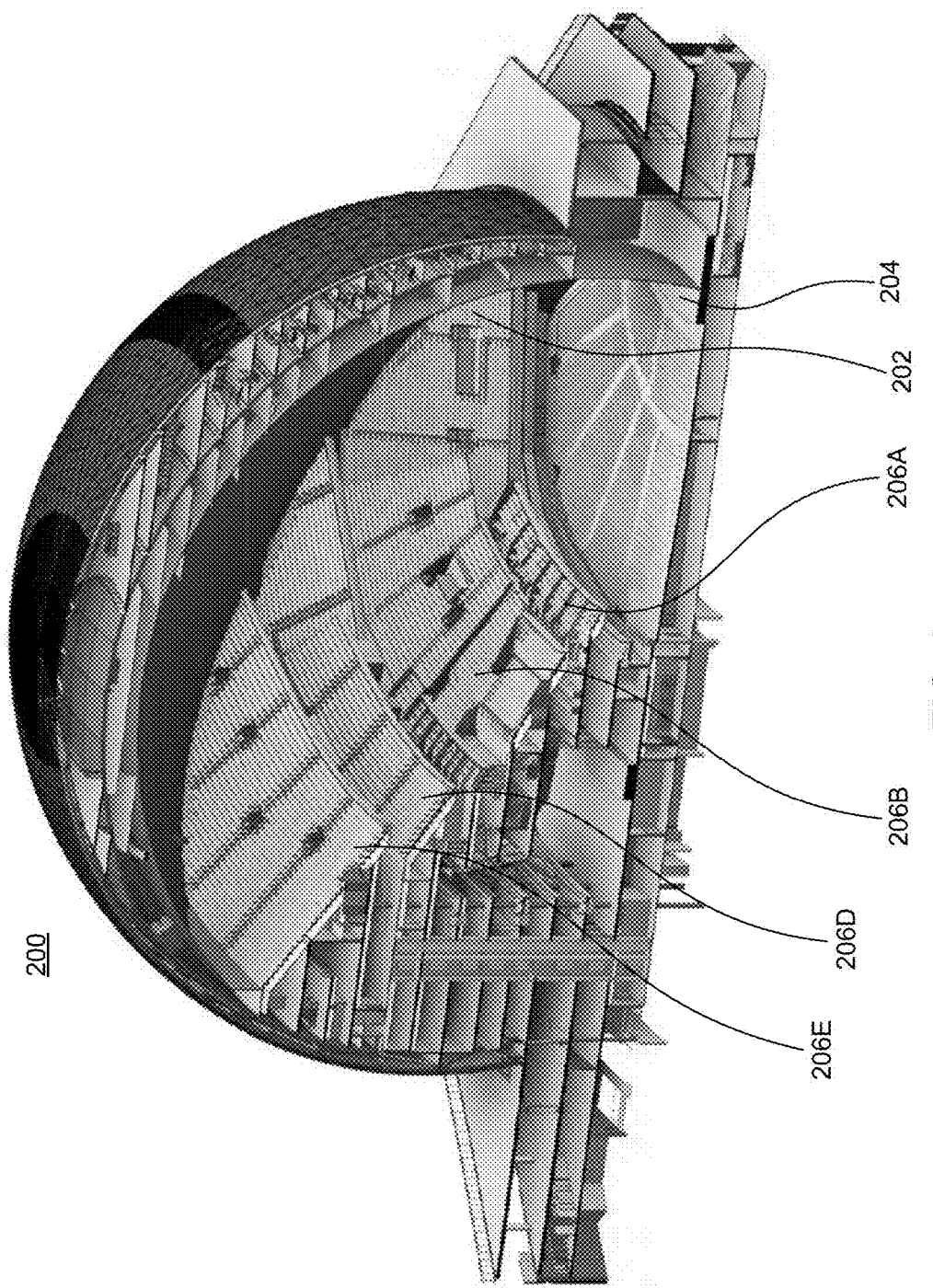
FIG. 2 illustrates an example venue of FIG. 1, according to some embodiments.

FIG. 2 illustrates an example of venue 200. Venue 200 may be a dome and thus may be enclosed by a curved interior defined by the dome. As illustrated, in some embodiments, the venue 200 may have a media surface 202 that is three-dimensional and curves to partially or completely surround viewers horizontally and/or vertically. Moreover, venue 200 may have a stage 204 and a plurality of viewer locations 206A-D. As illustrated, the viewer locations 206A-D may have different vantage points of the media surface 202.

Referring back to FIG. 1, as stated above, central server 102's application 108 permits users to derive visual guidance for presenting content on media surfaces of a venue. As stated above, the visual guidance is based on derived attributes. As such, the application permits users to perform experiments and analyses. The experiments derive key features and metrics to be utilized in the analysis to determine the corresponding attributes. Accordingly, the analyses utilize the experiments derived key features and metrics to determine attributes. The application 108 then provides visual guidance based on the attributes. The visual guidance relates to the viewer locations and the media surface, as will be explained in more detail below.

In some embodiments, the attribute may be a degree of a field of view from viewer locations, a distance to a portion of the media surface (e.g., a center of reticle 704 of FIG. 7) from viewer locations, an amount of a field of view occluded by venue structure (e.g., pole, stage objects, suspended or hanging objects) or viewer location geometry (e.g., where a seat is located) from viewer locations, an amount of content rendered on the media surface viewable from viewer locations, an amount of a media surface viewable from the viewer locations, and a degree of distortion of content from viewer locations, just to name a few examples. Along these lines, in some embodiments, the visual guidance may be provided as a heat map of the attribute with respect to the viewer location and/or media surface.

Accordingly, user devices 106A-B permit users (e.g., authorized users) to process experiments and/or analyses. Thus, user devices 106A-B may provide visual guidance to the user and permit the user to visualize how the customized media content will/may be presented at the venue based on the venue geometry. User devices 106A-B may be any type of computing device, such as a computer, tablet, cellular phone, laptop, desktop, and artificial reality device (e.g., a headset), just to provide a few examples.

Figure 3:
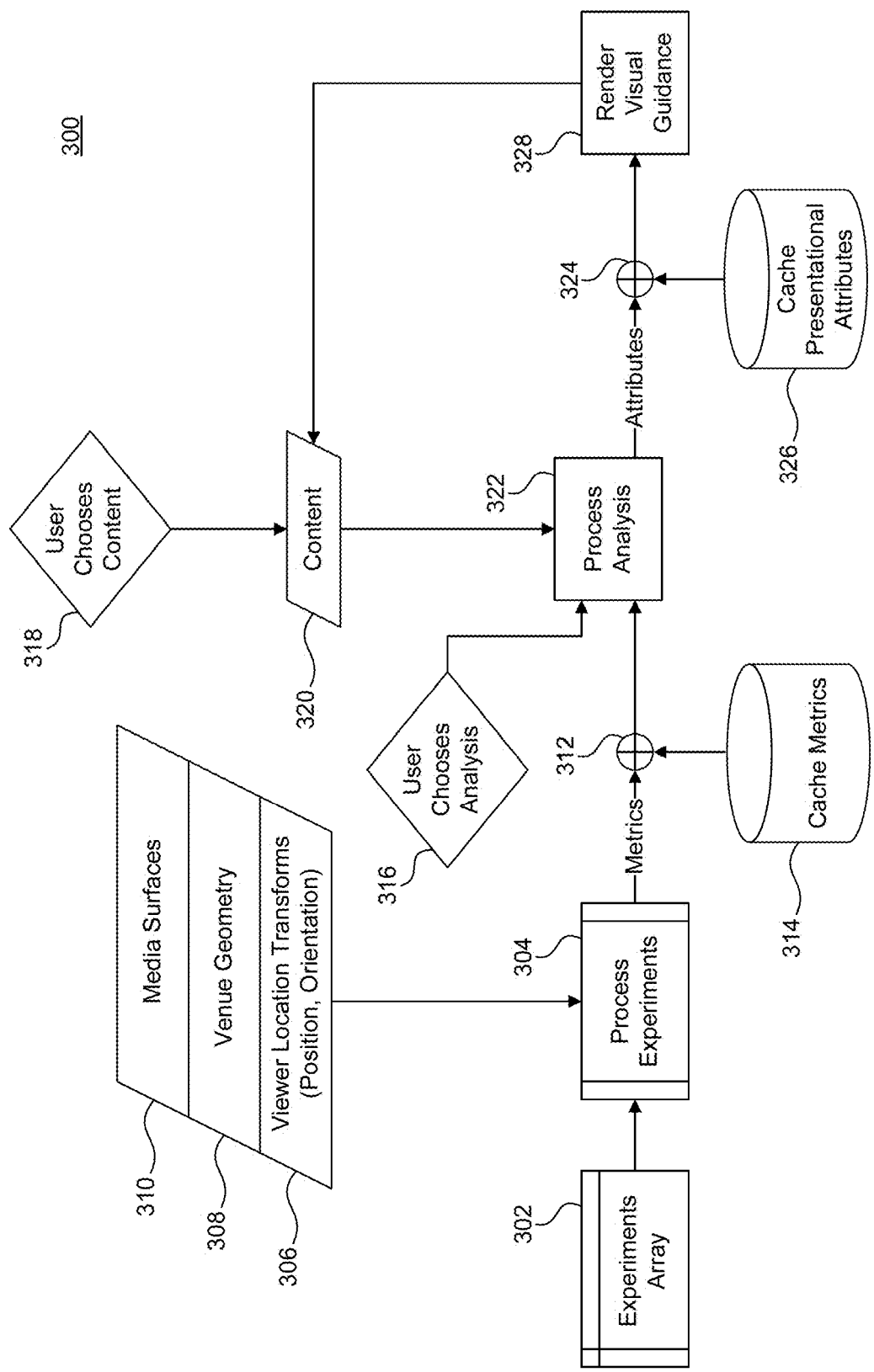
FIGS. 3 and 13 illustrate flowcharts of example processes for providing visual guidance on presenting content on a media surface of a venue, according to some embodiments.

FIG. 3 illustrates an example process 300 for deriving visual guidance on presenting content on a media surface of a particular venue, according to some embodiments. At 302, an experiment array including a plurality of experiments is provided, and one or more experiments are selected. In some embodiments, the user at user device 106 (of FIG. 1) may select a particular experiment. Alternatively, the user at user device 106 may select multiple experiments. The experiments may run sequentially or in parallel. Further, the experiments may be processed offline by central server 102 (of FIG. 1) and may thus be derived for a period of time (e.g., hours or days) or immediately prior to the process analyses.

The experiments may be utilized to determine metrics that are utilized for different analyses that correspond to different attributes. For instance, one experiment may be utilized to determine metrics that are utilized for an analysis that determines a particular attribute (e.g., a degree of a field of view from viewer locations). Similarly, another experiment may be utilized to determine different metrics that are utilized for another analysis that determines a corresponding attribute (e.g., an amount of content rendered on the media surface viewable from viewer locations).

At 304, the experiments are processed based on viewer location transformations (e.g., position and orientation of seat and/or standing location) 306, venue geometry (e.g., objects, overhangs) 308, and venue media surfaces 310. At 312, based on the experiments, metrics are derived, and, at 314, the metrics are cached.

Thereafter, at 316, a user selects an analysis to perform, and, at 318, a user chooses media content 320. The analysis may be a different one of the analyses that correspond to the different attributes. For example, one analysis may determine a particular attribute (e.g., a degree of a field of view from viewer locations), and another analysis may determine a different attribute (e.g., an amount of content rendered on the media surface viewable from viewer locations).

As such, at 322, the analysis is performed for the media content 320 based on the metrics derived at 312. As stated above, the analysis of 322 then derives attributes at 324, which are cached, at 326, and utilized to render visual guidance, at 328. The visual guidance 328 may relate to the media surfaces 310 or the media content 320 mapped onto the media surface 310. As such, the visual guidance 328 may be associated with the representative media content 320. In some embodiments, the visual guidance 328 may be provided as a heat map of the media surface and/or the viewer locations (e.g., seats or standing locations), as will be discussed in more detail below.

Figure 4:
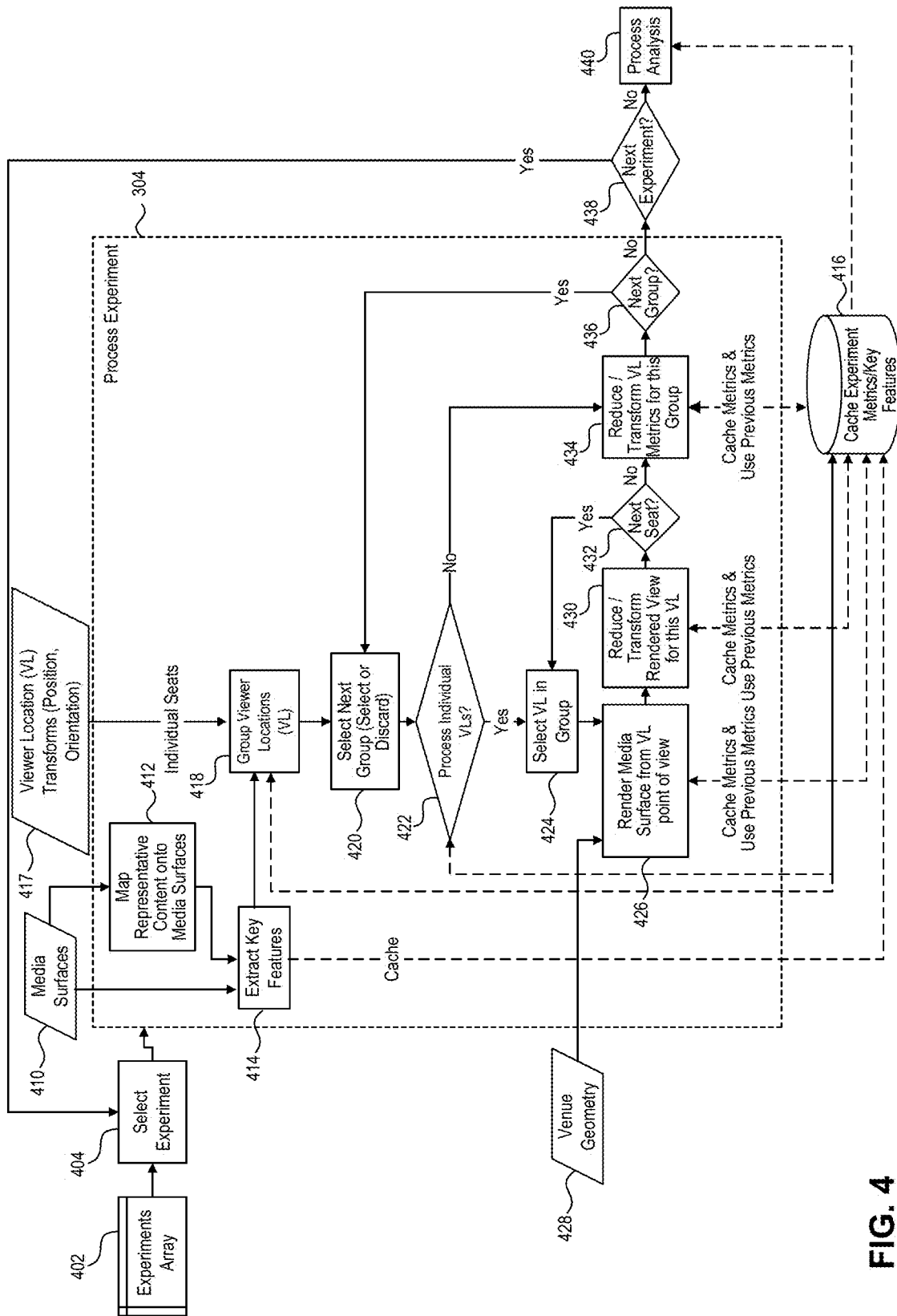
FIGS. 4 and 14 illustrate flowcharts of example experiment processes of FIG. 3, according to some embodiments.

FIG. 4 illustrates an example experiment process 304 of FIG. 3, according to some embodiments. At 402, an array of experiments is provided, and, at 404, one or more experiments are selected. After the selection of the experiments, the experiment process 304 begins.

In the experiment process 304, media surface 410 may be analyzed alone or together with representative media content. If the media surface 410 is analyzed alone, then, at 414, key features are extracted from the media surface 410 itself. However, if the media surface 410 is to be examined with the representative media content, then, at 412, the representative media content is mapped onto the media surface 410, and, at 414, key features are extracted from the mapped representative media content of 412. The representative media content may be provided so that it is mapped using various texturing methods (e.g., projection or UV mapping) onto a selected location, which may be selected by a user at user devices 106A-B (of FIG. 1) or selected by the application 108 (of FIG. 1). In some embodiments, the selected location on the media surface 410 may be a location that provides an ideal view of the representative media content to a specific viewer location (e.g., center middle). The ideal view of the representative media content is saved for comparison, as will be later discussed. Moreover, different experiments may be processed with the representative media content mapped with different texturing methods onto different locations of the media surface 410. This may allow for different texturing methods and locations to be analyzed in the analysis process and for different attributes to be derived so that the user may be provided with different visual guidance.

The key features may be sample points provided on the media surface or aspects (e.g., objects) of the representative media content mapped onto the media surface. For example, if the metrics relate to the media surface, the key features may be sample points provided on the media surface. Likewise, if the metrics relate to the representative media content mapped onto the media surface, the key features may be the aspects (e.g., objects) of the representative media content.

As stated above, the key features may be sample points provided on the media surface. The sample points may be utilized to identify a location on the media surface for aspects of the representative media content or to derive metrics later in the experiment process 304. As such, in some embodiments, the sample points may span the entire media surface. In some embodiments, the sample points may span the area of the media surface receiving the representative media content.

Further, the number of sample points may be based on the shape and/or size of the media surfaces as well as the aspects (e.g., objects) of the representative media content. For example, the greater the size of the media surface, the more sample points are provided. Further, if a portion of the media surface has greater than a specific degree of curvature than an adjacent portion of the media surface (e.g., 16 degrees), additional sample points may be provided.

Along these lines, after representative content is mapped onto media surfaces, sample points may be created. In some embodiments, the sample points may be created based on the UV coordinates from representative content as world space coordinates on the media surface. For example, if the representative content is an image of a triangle or a line, sample points may be created based on pixels of the image on the media surface. As such, irregular configurations of sample points may be based on pixels of the representative content.

Figure 5A:
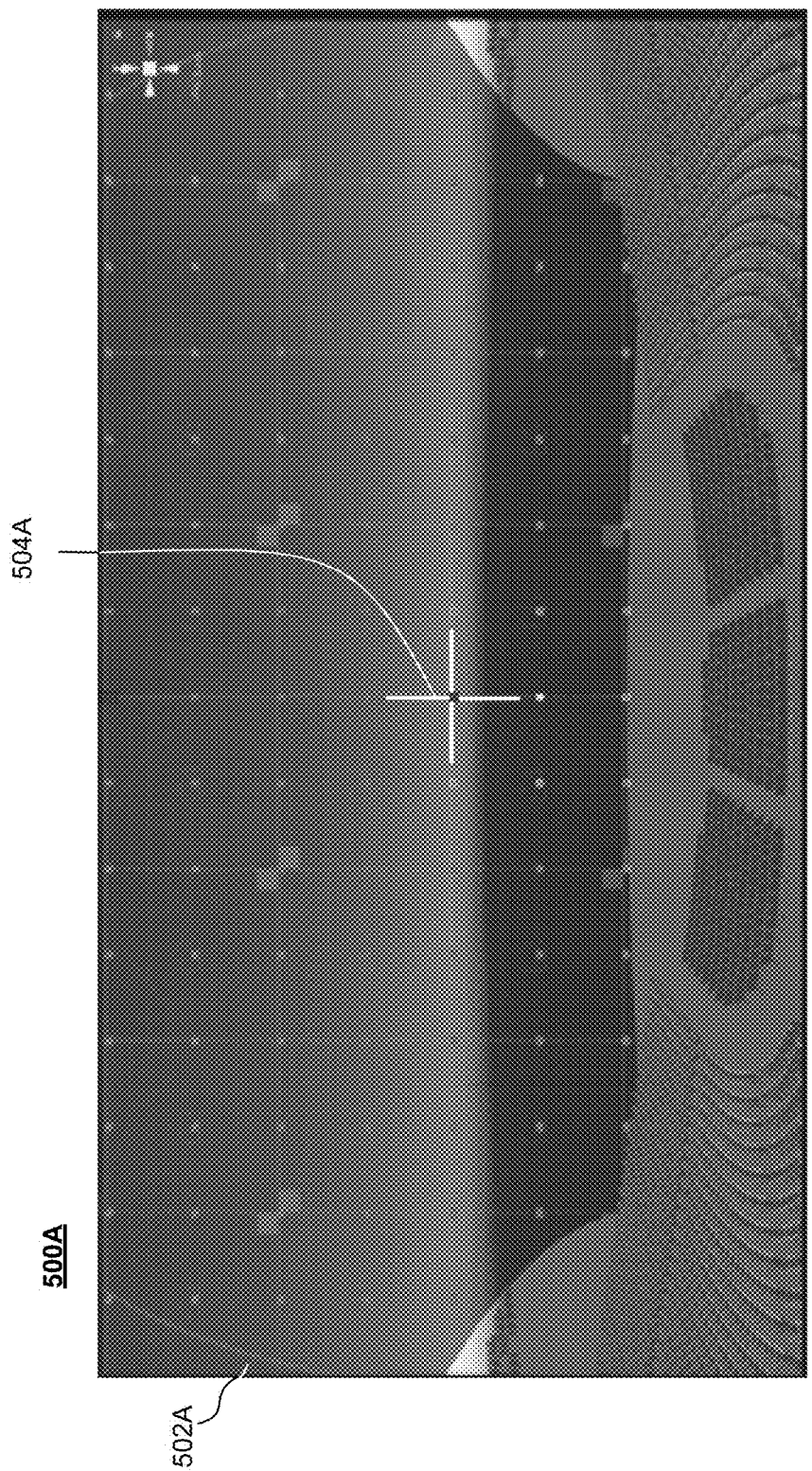
FIGS. 5A and 5B illustrate example user interfaces provided during the experiment processes of FIGS. 4 and 14, according to some embodiments.
Figure 5B:
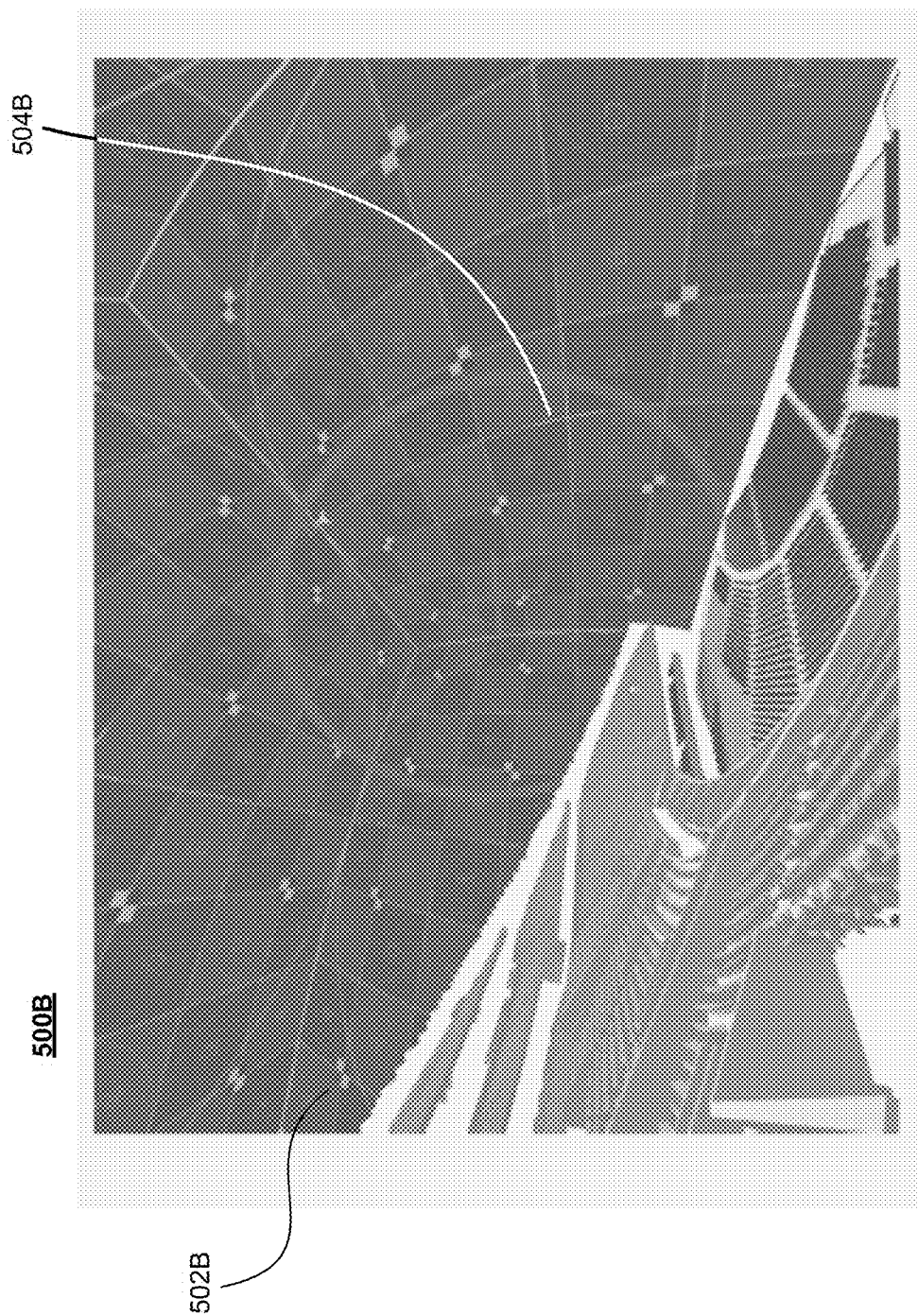

FIGS. 5A and 5B illustrate example user interfaces 500A/500B presenting sample points provided on media surfaces, according to some embodiments. User interface 500A illustrates sample points on media surface 502A from a first viewer location. User interface 500B illustrates sample points on media surface 502B from a second, different viewer location. User interfaces 500A/500B provide a crosshair 504A/504B correlating to a sample point generated procedurally or from the representative content on the media surface.

Referring back to FIG. 4, as stated above, the key features may be objects of representative media content mapped onto the media surface. As such, the key features may include qualitative tags of the media surfaces and/or the representative media content mapped on the media surface. The qualitative tags may describe the media surface and/or the mapped representative media content. As such, the qualitative tags may describe sections of the media surface (e.g., geometric portions or sample points) or the entire media surface in more human-readable terms. For example, qualitative tags may be provided on sections that are vertical, horizontal, curved, straight, distorted, and/or less visible. The qualitative tags may be assigned procedurally as part of the experiments or manually by the user. Moreover, the qualitative tags may be utilized as a metric and used for later analysis.

Further, the qualitative tags may specify the salient, selected, and/or procedural data from the media surface and/or mapped representative media content. As such, the qualitative tags may be attached to or specify sets of sample points, line segments, polygons, or binary large object (BLOB) that track salient or desirable pixels or objects in the representative media content presented in the media surface. For example, the qualitative tags may bound and track the geometry of objects in the representative media content. The quantitative tags may also provide an indication of the vector motion (e.g., right to left or vice versa) and speed of motion (e.g., too fast or slow) of objects in the representative media content that can then be used to obtain the rate of change of this motion across various sample points on the media surface. This may allow more complex measurements (e.g., distance, angle, distortion, and curvature, and angles) to be obtained from the viewer locations in a more human-readable form for use in the analysis. Moreover, extracted key features may include UV or XYZ coordinates (for two- and three-dimensional media surfaces, respectively), colors, and other texture data that can be programmed into a shader to aid in the rendering step of the experiment and allow the extraction of texture data from the viewer's point of view.

The sample points and/or qualitative tags may be provided manually, for example, by a subject matter expert via user devices 106A-B (of FIG. 1). Alternatively, the sample points and/or qualitative tags may be automatically provided by central server 102's application 108 (of FIG. 1). For example, application 108 may automatically identify objects in the representative media content and provide qualitative tags. Along these lines, application 108 may utilize a machine learning model to provide qualitative tags automatically. The machine learning model may be initially trained based on predetermined representative media content.

After extracting the key features, they are cached into storage 416 and made available for use in future experiment and analysis processes. Thereafter, at 418, viewer locations (e.g., seats or standing positions) are grouped. The viewer locations may be grouped manually, spatially, or statistically in an automated or pre-determined way. By grouping the viewer locations, data relating to the extracted key features may be deduced from each viewer location and then aggregated together to provide cumulative data representative of the entire group of viewer locations. Moreover, it also provides a way of accelerating computation through sampling methods and providing more accurate visual guidance.

After grouping the viewing locations, at step 420, an initial group of viewer locations is selected and, at 422, the group of viewer locations is either processed iteratively or if data has already been cached for that group of viewer locations in a previous experiment, then we continue to 434. If each viewer location of the group is to be iteratively processed, then, at 424, a viewer location in the group is selected. Thereafter, at 426, the point of view of the media surface from the viewer location is rendered based on venue geometry 426. The rendering may be created through various mapping methods (e.g., ray casting, rasterization, and raytracing) that take into account the key features in the representative media content (e.g., for algorithms or models that can be trained on this data) or media surfaces as necessary and also takes into account any venue geometry which may be visible by this viewer location's point of view of the media surface (e.g., to take into account occlusions). The rendering may provide an image of the point of view of the media surface from the view location.

Also, at 426, metrics from the point of view are determined based on the viewer location. As stated above, the rendering may be three-dimensional. Similarly, the metrics may be based on the media surface and/or aspects (e.g., objects) of the representative media content mapped on the media surface. Accordingly, the metrics may be multi-dimensional (e.g., three-dimensional) scalar or vector fields (e.g., points) relating to the media surface or aspects of the representative media content mapped thereon. Metrics may include a distance to a portion of various sample points on the media surface, curvature at a sample point on the media surfaces (e.g. due to perspective effects) with respect to viewer location, an amount of a field of view occluded by venue structure (e.g., pole) or viewer location geometry (e.g., where a seat is located), and an amount of content rendered on the media surface viewable, just to provide a few examples.

Thereafter, optionally, at 430, the rendering/metrics of 426 may be reduced into a smaller set of metrics and/or transformed into a different set of metrics. For example, the distance to the various locations sample points may be averaged to provide a representative distance to the media surface. Moreover, the angle of a view of sight to a center sample point or set of tagged sample points may be determined. Further, the rendering of the point of view from the viewer location may be compared to the previously-saved ideal mapping or projection of the representative media content to determine a degree (e.g., a percentage) of accuracy or deviation from an ideal mapping or projection. For example, these renderings from the ideal mapping position may be used in the analysis to show a user how the media surfaces and viewer locations affect the content they designed and how much it deviates from the desired original user produced content.

Subsequently, at 432, if there is another viewer location in the group, the process returns to 424, performs steps 426 and 430 as described above for the next viewer location, and caches their derived viewer location metrics into storage 416. Accordingly, after all of the viewer locations in the group are processed, at 434, the individual per viewer locations metrics of 426 and/or 430 are processed into a metric (e.g., single metric) representing all of the individual metrics for the aggregate group derived at 430. Similarly, at 434, the individual renderings of the points of the view of the media surface from the respective viewer locations may be combined to provide a representative rendering (e.g., image) of the point of view of the media surface for the group. This may be done via an image operation (e.g., average, subtraction, multiplication, addition, mean, standard deviation) on all of the viewer locations in the group. The group metric and/or rendering is also cached into storage 416.

At 436, the process determines if there are any more groups to be processed. If so, the process returns to 420. Otherwise, the process proceeds to 438 to determine if there are any more experiments to be run. If there are additional experiments to be run, the process returns to 404. If not, the process continues to 440, where the analysis processed is run. As will be discussed in more detail below, the analysis is based on the cached key features, individual metrics, and group metrics.

Along these lines, additional experiments may be run for the same group to derive different metrics corresponding to different attributes for the same key feature. The metrics may then collectively be utilized in the analysis process 322 (of FIG. 2). Along these lines, the key features and/or metrics derived for a particular experiment may be utilized in different experiments corresponding to the same or different metrics.

Figure 6:
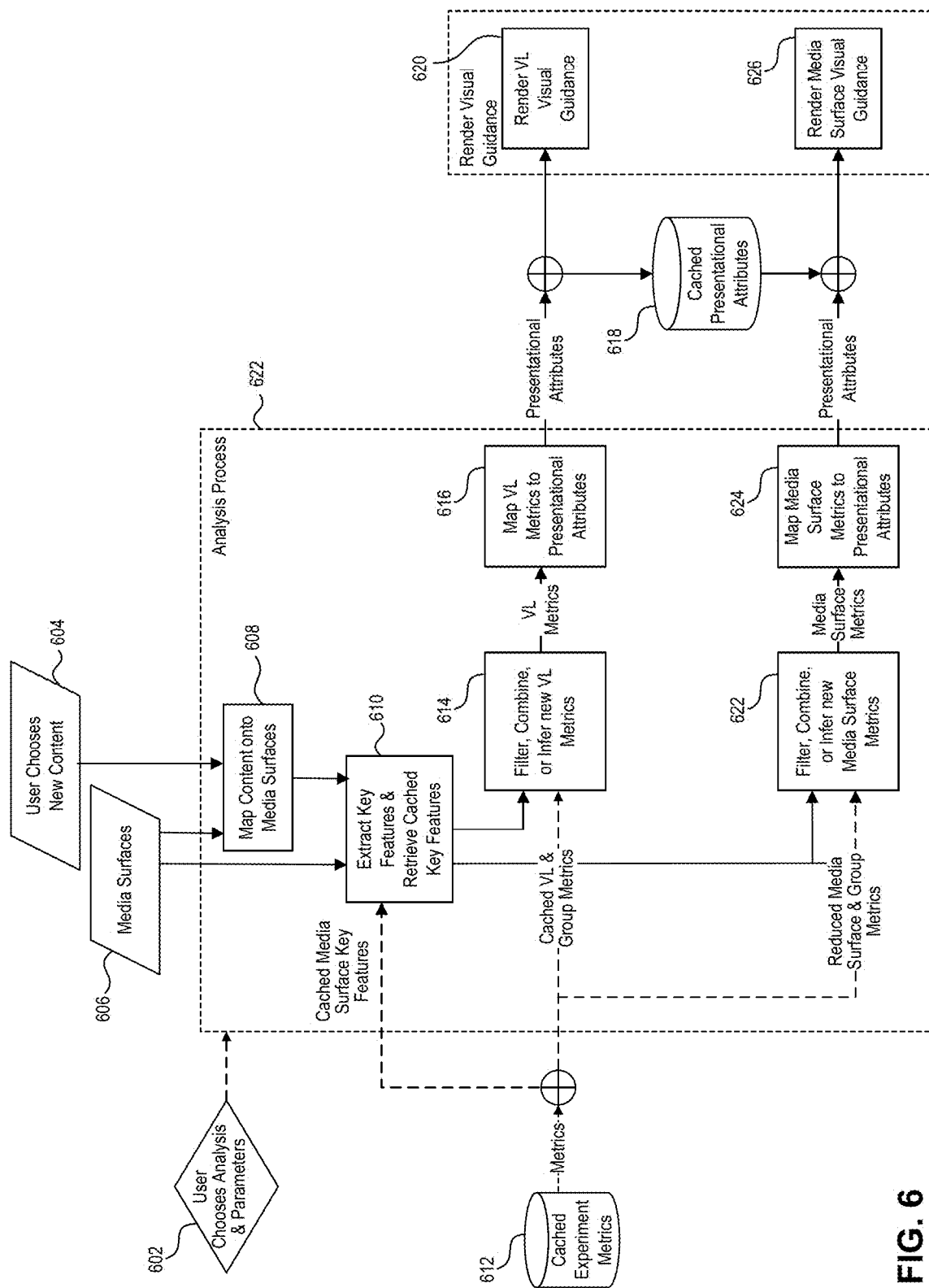
FIGS. 6 and 15 illustrate flowcharts of example analysis processes of FIG. 3, according to some embodiments.

FIG. 6 illustrates an example analysis process 322 of FIG. 3, according to some embodiments. As stated above, at 602, a user selects one of a plurality of analyses and indicates parameters for the analysis (e.g., colors, filter parameters, output format, viewer locations or groups of viewer locations), and, at 604, the user selects new media content (e.g., different from the representative media content of the experiment process 304 of FIG. 3). As stated above, the analyses correspond to different attributes. After the selection of the analysis and media content, the analysis process begins.

In the analysis process 322, like in experiment process 304, media surface 606 may be examined alone or together with media content. If the media surface 606 is examined alone, then, at 610, key features are extracted from the media surface 606 itself. However, if the media surface 606 is to be examined with the media content, then, at 608, the media content is mapped onto the media surface 606, and, at 610, key features are extracted from the mapping of 608. The mapping of the media content may be provided on a location of the media surface 606 that provides an ideal view of the content, as described above in the experiment process 304 (of FIGS. 3 and 4). The ideal view of the media content is saved for comparison, as will be later discussed. Moreover, different experiments may be processed with the media content mapped onto different locations of the media surface 606.

Further, at 610, additional key features relating to the media surface may be received from the cached experiment metrics/key features at storage 612. The additional key features may be those that are unaffected from the different media content (e.g., sample points on the media surface) and thus do not have to be determined again. This may save processing time and power.

Thereafter, the analysis process 304 may then proceed to 614 and/or 622 for deriving viewer location metrics and media surface metrics, respectively, which can be processed sequentially or in parallel. In 614, the viewer location metrics and/or groups of viewer location metrics created in the experiment process are retrieved from storage 612 based on the user-provided parameters (e.g., viewer locations or groups of viewer locations). Thereafter, at 614, the viewer location metrics and groups of viewer locations are combined with those of the new key features. This can be done in real-time or near real-time to provide a new set of viewer location metrics.

Similarly, in 622, media surface renderings provided in the experiment process are retrieved from storage 612. Thereafter, in 622, the media surface renders are correlated to the user-provided parameters to extract simpler views of media surface metrics that can be pushed to the presentational attributes mapping step. Newly extracted key features from the chosen user media content can also be used and combined with previous experiment data to allow for faster analysis of new content using previously calculated values and models. In this analysis process, for example, an algorithm or model (e.g., machine learning or traditional algorithm) can be used to infer new metrics by taking the key features from the media content (e.g., such as moving objects) and correlating them with previously collected metric data of the media surfaces (e.g. such as the portions of the media surfaces optimally viewed by the greatest groups of seats) to provide a new combined set of new metrics on the media surfaces to show how the media content can affect a group of users (i.e., if only some users can see the moving content). This data can be further refined and aggregated to provide a final set of metrics for the media surfaces.

Thereafter, in 616 and 624, the viewer location metrics and media surface metrics are converted into presentational attributes that are ready for rendering to show the user, respectively. For example, the determined angles and distances with respect to a user-supplied parameter region on the media surfaces with respect to the viewer locations are converted into presentational attributes for each viewer location. Another example, the collective viewing areas of a group of viewer locations are converted into presentational attributes on the media surfaces. The presentational attributes may be percentages, values within ranges, and UV or XYZ coordinates, as well as colors associated with any of aforementioned, just to provide a few examples. The presentational attributes derived in 616 and 624 are then cached in storage 618. Accordingly, after caching the presentational attributes, the analysis process 622 ends. As described above, the central server 102 (of FIG. 1) may retrieve the attributes from the storage 618 and provide visual guidance to users.

Figure 7:
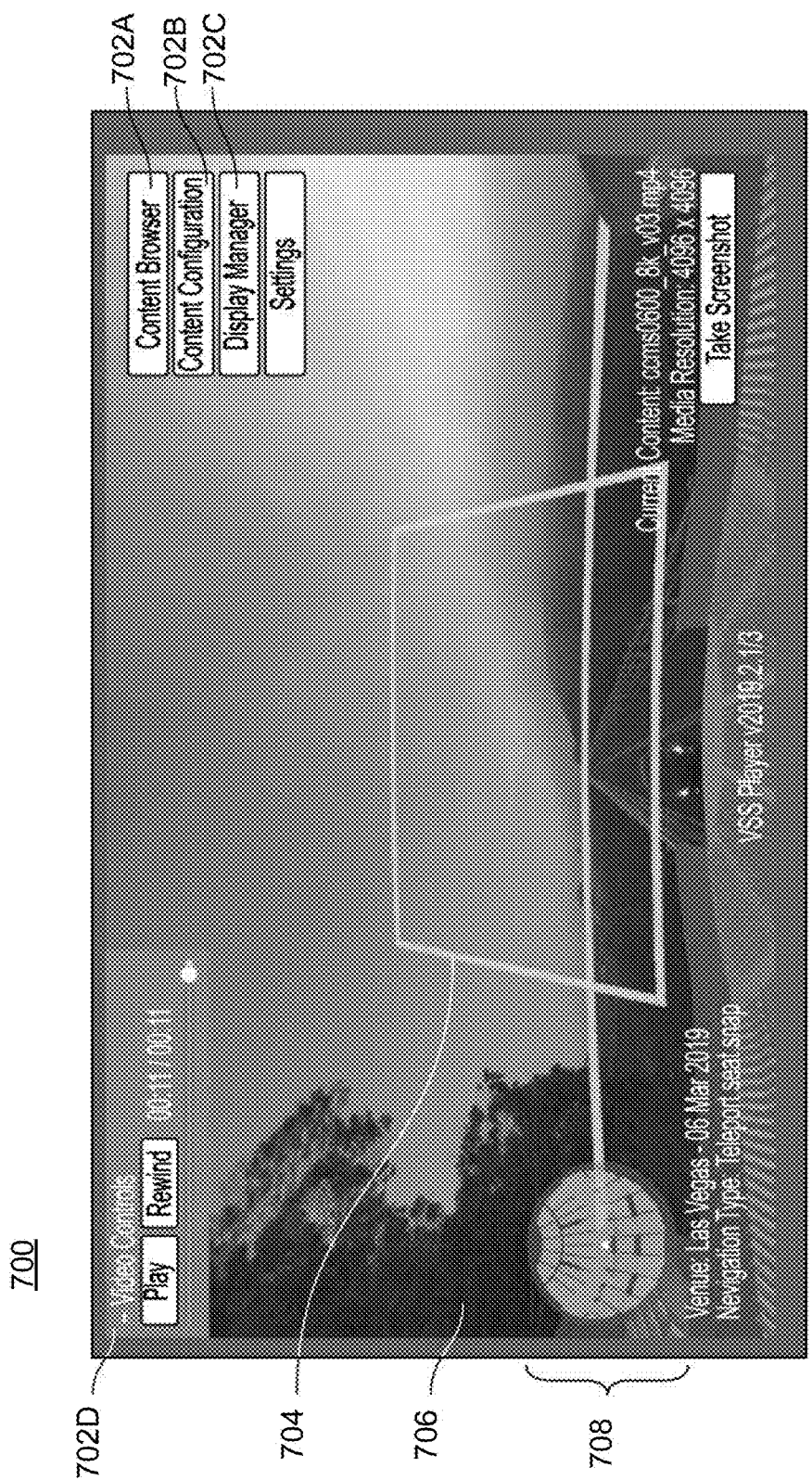
FIGS. 7-9, 10A-C, and 11 illustrate example user interfaces for providing the visual guidance of FIG. 2, according to some embodiments.

FIG. 7 illustrates an example user interface 700 for performing the analysis process of FIG. 4, according to example embodiments. User interface 700 is the main interface for triggering the analysis process. As such, user interface 700 presents command buttons 702A-D, reticle 704, horizon line 706, and viewer location simulator 708. Command button 702A permits access to various content to be projected on the media surface. The user may then select the desired content to be projected on the media surfaces. Command button 702B permits the mapping and projection of the selected content to be adjusted. For example, the media content may have different projection modes (e.g., fisheye, perspective, orthographic, ultra-wide angle, omnimax, panoramic, cylindrical, spherical). As such, based on the projection mode, the unique properties of the projection mode may be modified. For example, if the projection mode is fisheye, the "Center U," "Center V," and "Radius U" may be modified. Further, the texture of the media content may be modified (e.g., pan, tilt, and roll).

Command button 702C permits modification of reticle 704 and horizon line 706. Reticle 704 provides the main viewing perspective to be analyzed in the analysis process 322 (of FIG. 3). As such, media content (e.g., objects) within reticle 707 may be analyzed in the analysis process 322. Horizon line 706 runs through, and intersects with reticle 704, and assist the user in modifying the projection of the media content onto the media surface (e.g., tilting). Accordingly, command button 702C permits a selection of a shape of reticle 704 (e.g., square, rectangle, circle) and a size of reticle 704 (e.g., smaller or smaller with respect to venue), as well as an adjusting (e.g., tilting of the image) via the horizon line 706.

Figure 8:
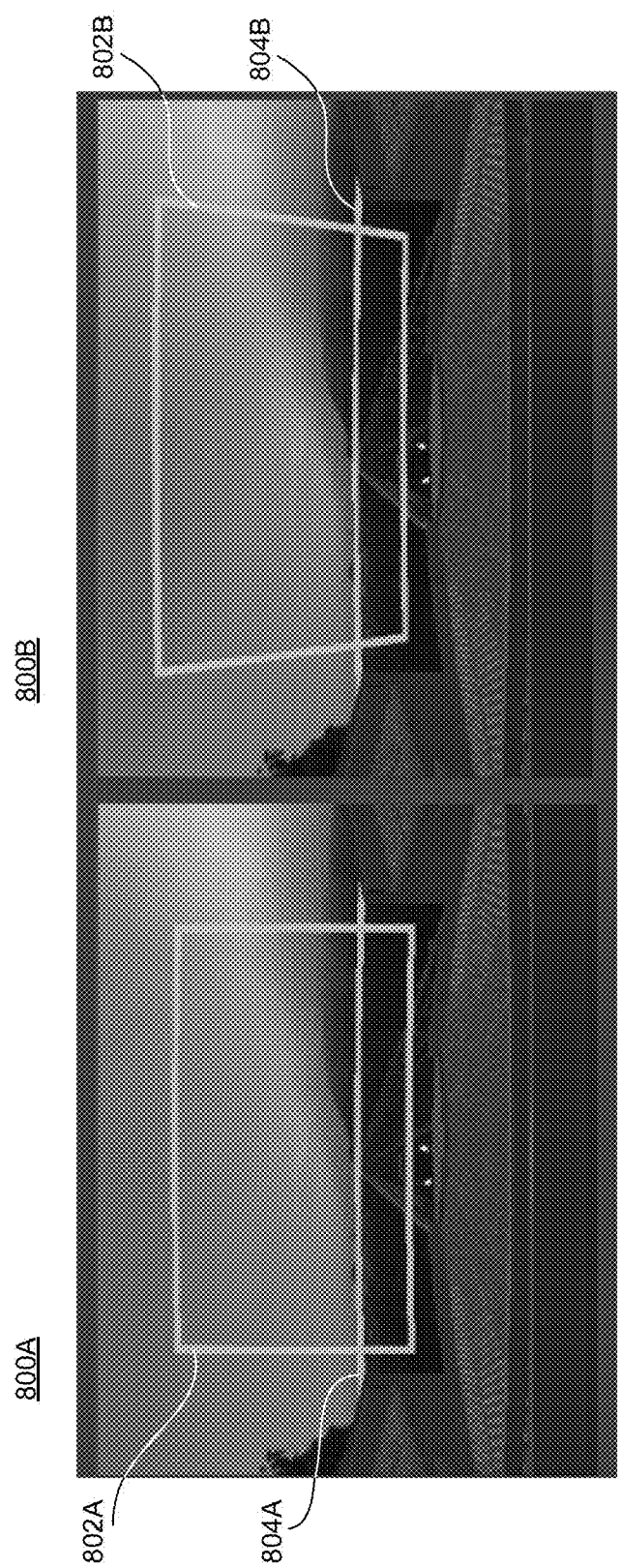

FIGS. 8A and 8B illustrate example user interfaces 800A/800B presenting supported reticle and 802A/802B projections. Reticle 802A and horizontal line 804A are a translational rectilinear projection. As such, reticle 802A and horizontal line 804A is two-dimensional and moves from one point to another point on a straight line. Reticle 802B and horizontal line 804B are an orbit rectilinear projection and moves within three-dimensions. As such, reticle 802A may be utilized for two-dimensional media content, and reticle 802B may be utilized for three-dimensional media content.

Referring back to FIG. 7, command button 702D provides video controls (e.g., play, rewind, and forward) of media content projected on the media surfaces. Viewer Location Simulator 708 provides hints of the visual guidance to be provided for the attribute being derived. In some embodiments, as will be described below, the visual guidance may be provided in the form of a heat map. The visual guidance may be rendered back into the three-dimensional space and the venue geometry in the application so that the user can see the hints directly on the media surface and the viewer location of the venue. The visual guidance may be rendered back into the three-dimensional replication of the venue in the application so that the user can see the hints directly on the media surface and the viewer location of the venue.

Figure 9:
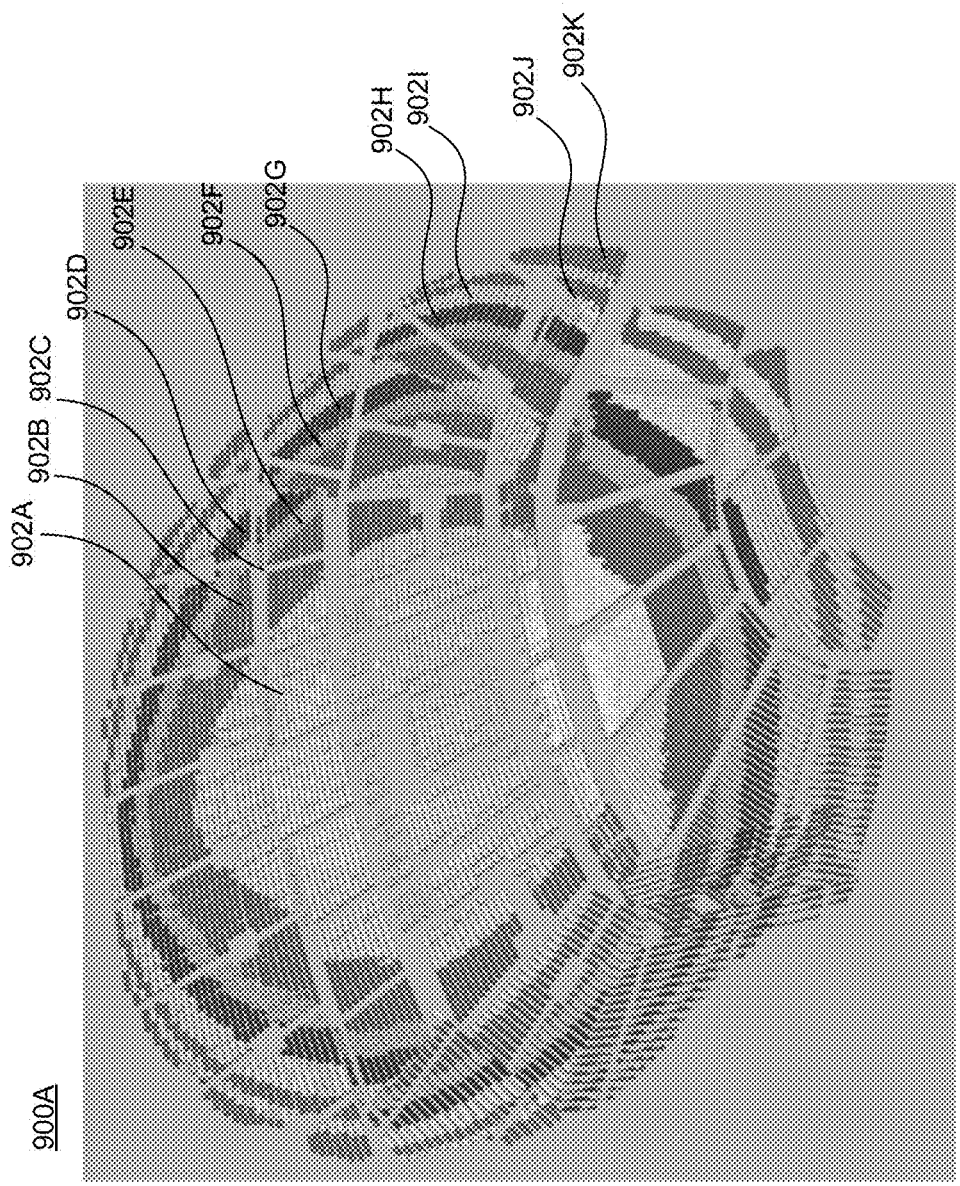
Figure 10A:
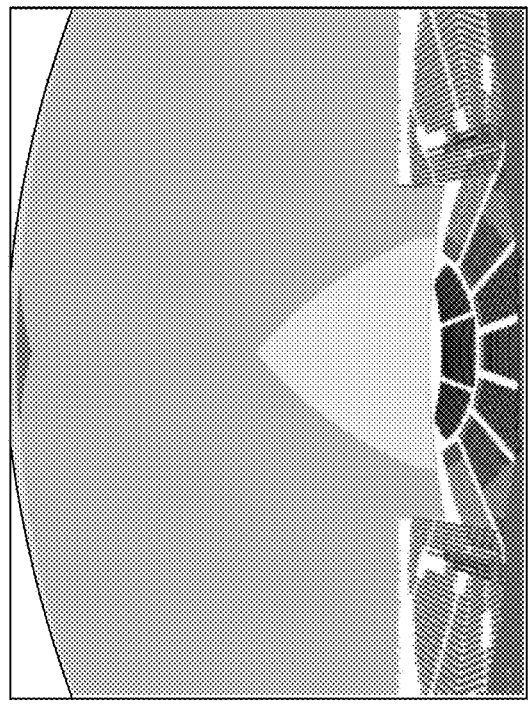
Figure 10A:
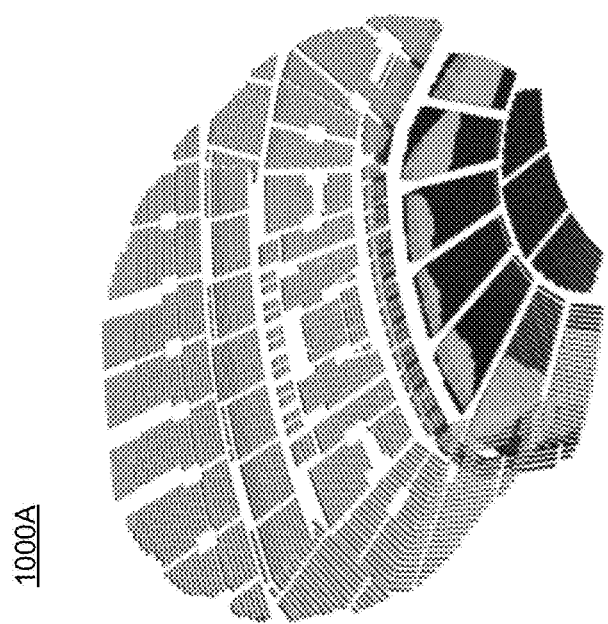
Figure 10B:
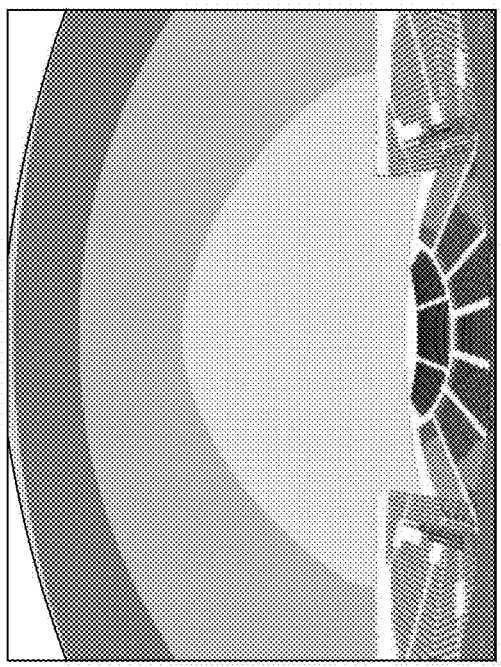
Figure 10B:
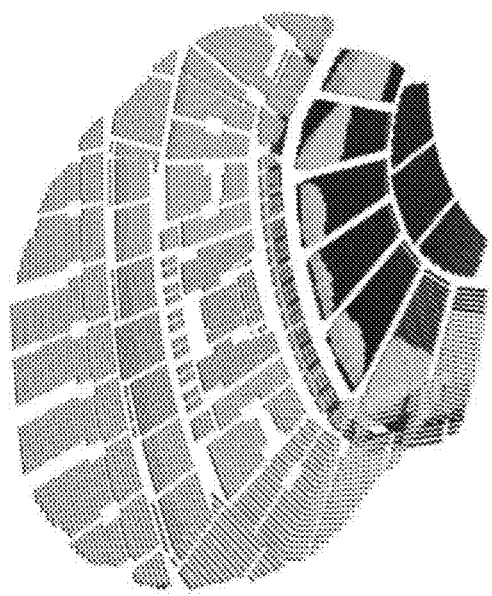
Figure 10C:
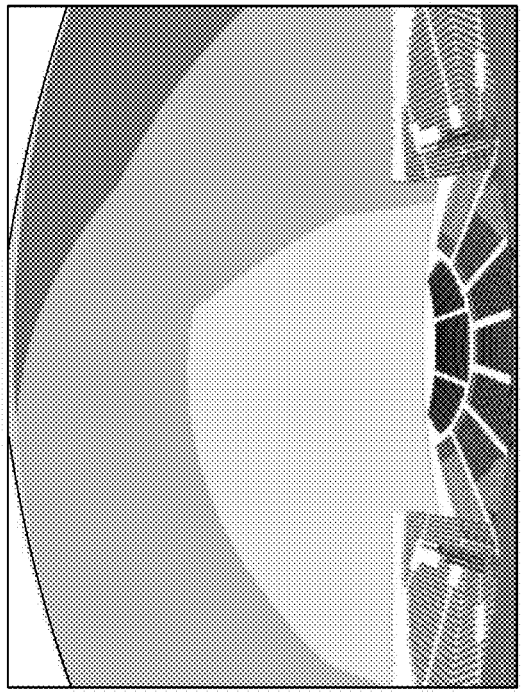
Figure 10C:
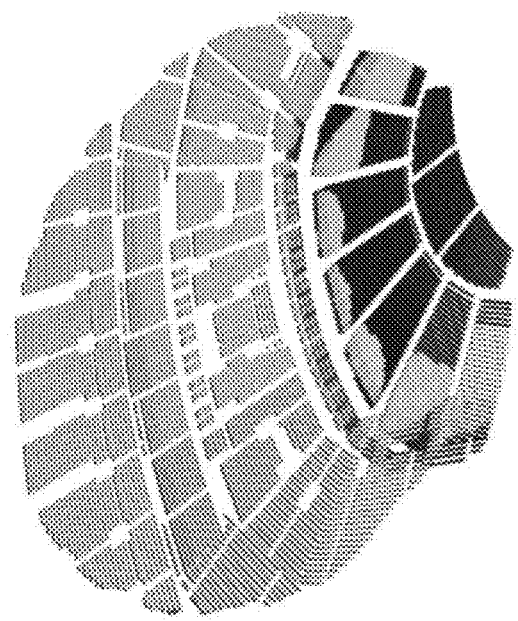
Figure 11:
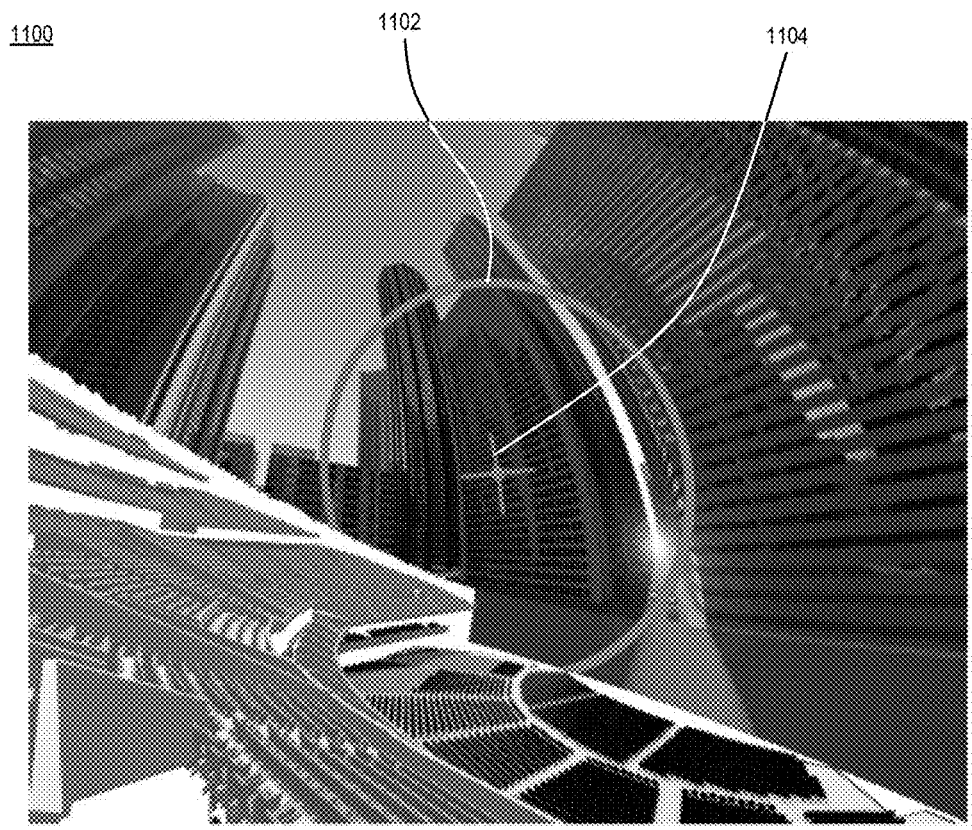

FIGS. 9-11 illustrate example user interfaces providing visual guidance on presenting content on a media surface of a venue, according to some embodiments. As stated above, the visual guidance is provided based on the attributes, which are based on viewer locations and/or the media surface. The attributes may be based on the viewer location metrics and media surface metrics derived into the analysis process, as described above. As such, the attribute may relate to the media surface itself or the mapping of the media content onto the media surface. For example, the attributes may include a degree of a field of view from viewer locations, a distance to a portion of the media surface (e.g., a center of reticle 704 of FIG. 7) from viewer locations, an amount of a field of view occluded by venue structure (e.g., pole) or viewer location geometry (e.g., where a seat is located) from viewer locations, an amount of content rendered on the media surface viewable from viewer locations, an amount of a media surface viewable from the viewer locations, and a degree of distortion of content from viewer locations, just to name a few examples.

In some embodiments, the visual guidance may be hints. For example, the hints may be heat maps of the viewer locations and/or media surface. The heat maps may provide a graphical representation of the attributes. The graphical representation may include colors and may have a particular color scheme. The colors may be based on viewer location metrics and/or media surface metrics derived for the attribute. Accordingly, each attribute may have different ranges of viewer location metrics and/or media surface metrics corresponding to different colors. For example, a heat map may present green, yellow, and red for different ranges of viewer location metrics for an attribute (e.g., a field of view from viewer locations). Another heat map may present different shades of green for different ranges of media surface metrics for a different attribute (e.g., a distance from viewer locations to a particular point of the media surface).

Along these lines, the viewer locations may each have a viewer location metric and/or a media surface metric, as well as a color associated therewith. Alternatively, the viewer locations may be grouped, either by a user of user device 106A-B or automatically by central server 102. For example, the viewer locations may be grouped based on the venue provided section number (e.g., sections 101, 102, 201, 201, 301, and 302). The viewer locations may also be grouped based on venue provided section level (e.g., levels 100, 200, and 300). The viewer locations may further be grouped based on the viewer location and/or media surface values derived by the analysis process 600 (of FIG. 6). Accordingly, the groups of viewer locations may have a representative viewer location metric and/or a representative media surface metric, as well as a representative color associated therewith. The representative viewer location metric and media surface metric may be an average of individual viewer location metrics and media surface metrics, respectively, in the group.

As such, in an embodiment, the attribute may be a distance of the viewer locations from a particular point on the media surface, and the heat map's colors may represent different ranges of distances (e.g., 0 ft. to 6 ft., 6 ft. to 9 ft., 9 ft. to 12 ft., etc.) from a particular point on the media surface for different sections of viewer locations. In another embodiment, the attribute may be an amount (e.g., percentage) of a field of view occluded by venue structure (e.g., a pole or an overhang) or viewer location geometry (e.g., where a seat is located) from viewer locations, and the heat map's colors may represent different ranges of amounts (e.g., 0.00% to 0.016%, 0.016% to 0.32%, 0.32% to 0.48%, etc.) of fields of view obstructed by venue geometry or viewer geometry for different sections of viewer locations. In yet another embodiment, the attribute may be an amount (e.g., a percentage) of media content viewable from the viewer locations, and the heat map's color may represent different ranges of amounts of screen amount (e.g., 0% to 10%, 10% to 20%, 20% to 30%, etc.) of screen content viewable for different sections of viewer locations.

FIG. 9 illustrates an example of viewer location heat map 900 of venue 200 (of FIG. 2), according to some embodiments. As illustrated, viewer location heat map 900 may present groups of viewer locations 902A-H having different colors. The different colors represent different ranges of viewer location metrics associated with an attribute of the media surface or the media content mapped on the media surface.

Further, viewer location heat map 900A may be interactive. As such, viewer location heat map 900 may permit a user to select a particular group of viewer locations 902A-H and view a media surface heat map corresponding to the particular group of viewer locations such that the user can place themselves in any viewer location within the heat map. As described above, the groups of viewer locations 902A-H may have representative viewer location metrics which are based on each viewer location metrics in the group. Moreover, viewer location heat map 900 may permit a user to select a particular viewer location and view a media surface heat map corresponding to the viewer location. In some embodiments, although not illustrated, individual and/or group metrics in a table or list format may be provided for user review, such as to investigate a specific individual and/or group viewer location.

FIGS. 10A-C illustrates selected groupings of viewer location heat map 1000A-C and their corresponding media surface heat maps 1002A-C, according to some embodiments. As described above, the viewer locations may be grouped in the experiment process 304 (of FIG. 3), and their corresponding attributes may be determined in the process analysis 322 (of FIG. 3). As such, the user may select one of the predetermined groupings and view the corresponding media surface heat map. Alternatively, as also described above, attributes may be derived for each viewer location in the process analysis 322. Accordingly, the user may selectively group the viewer locations and view the corresponding media surface heat maps. Moreover, although not illustrated, the user may select a particular viewer location, either before or after selecting the group, and view the corresponding media surface heat map. The view of the particular viewer location may be from a first- or third-person view.

FIG. 11 illustrates an example field of view 1100 of media content mapped onto a media surface from a selected viewer location or viewer location group, according to some embodiments. The field of view 1100 may include a center of the field of view 1102 and a middle 1104 of the center of the field of view 1002. This may indicate a location on mapped media content that is naturally within the perspective of the viewer location grouping. The field of view 110 may also be utilized as a user-supplied parameter to the analysis to reduce the metrics from this area on the media surface and get a better idea of localized metrics. Moreover, although not illustrated, the user may select a particular viewer location, either before or after selecting the group, to acquire the corresponding field of view of the media content mapped onto the surface.

Figure 12:
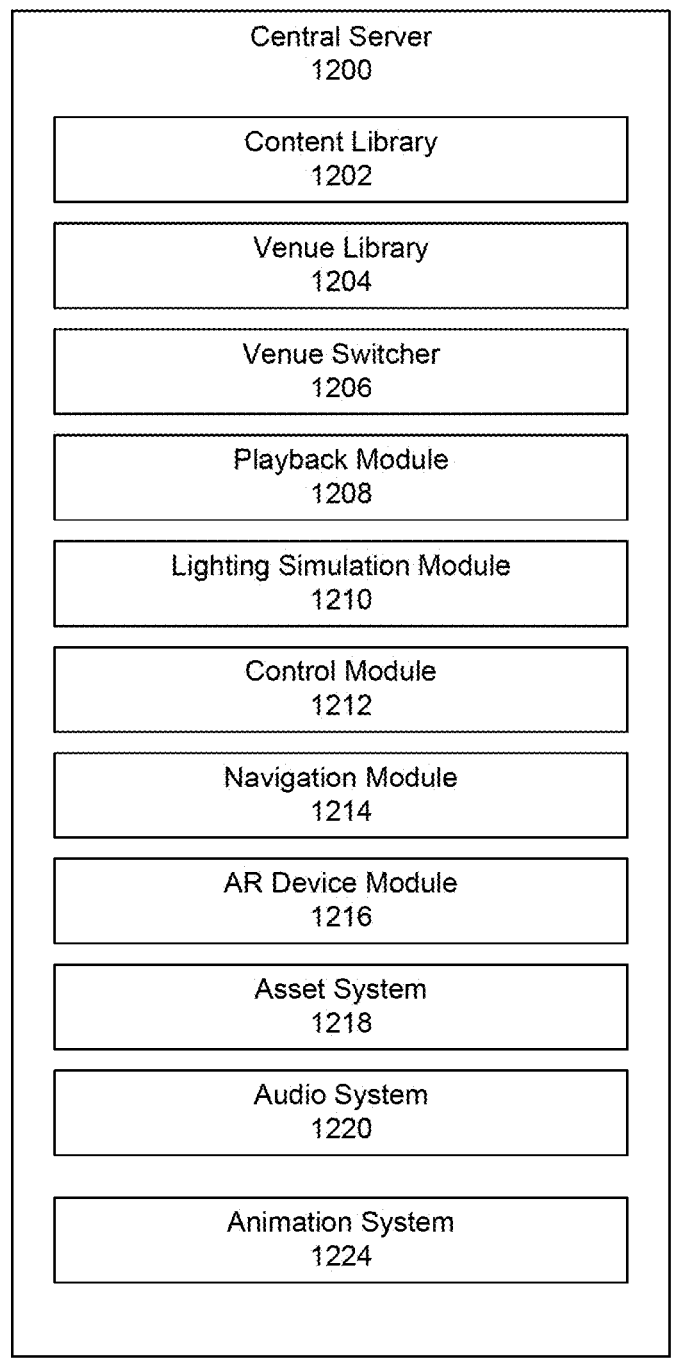
FIG. 12 illustrates an example central server of FIG. 1, according to some embodiments.

FIG. 12 illustrate an example central server 102 of the system 100 of FIG. 1, according to some embodiments. Central server 102 includes content library 1202, venue library 1204, venue switcher 1206, playback module 1208, lighting simulation module 1210, control module 1212, navigation module 1214, augmented or mixed reality (AR) module 1216, asset system 1218, audio system 1220, application programming interface (API) 1222, and animation system 1224. As discussed above, venue servers 104A-B and/or user devices 106A-B (of FIG. 1) may perform the processing of central server 102. Accordingly, the venue servers 104A-B and/or user devices 106A-B may also include these components.

Content library 1202 stores media content that may be presented on media surfaces of various venues. This includes curated content that allows for someone to understand and get a feel for the venue as well as custom content to allow for designing and reviewing the new content. Moreover, content library 1202 permits importing, loading, and streaming content from a variety of local and external sources (e.g., in-memory media, local storage, networked storage, and cloud services).

Venue library 1204 stores curated and custom venue files in a three- or two-dimensional asset format that can be easily placed and transformed (e.g., translated, rotated, scaled) anywhere inside the venue. Venue library further permits loading, importing, streaming externally curated, and custom venue files.

Venue switcher 1206 permits the selection of a particular venue to be simulated. This permits an understanding of how content, seating, and stage arrangements translate from venue to venue. Each venue has custom data associated with it, including a format that describes all seating and viewer location positions and groups. As such, the venue switcher 1206 also allows testing theoretical architectural models and media surfaces.

Playback Module 1208 is a virtual projection studio suited for implementing any kind of content projection or transformation on media surfaces of a venue. As such, the playback module plays back any media (e.g., images, video, procedural content, and real-time content) to simulate the media content experience inside of the venue. The playback module 1208 may use real-time GPU accelerated shaders to transform various spherical and rectilinear content to be displayed with any geometric transformation. The playback module 1208 also may project content onto multiple focal points of the media planes to optimize content for multiple sections of seating. In doing so, playback module 1208 supports any arbitrary output shapes on the media surface (e.g., rectangular, circular, split-screen, other shape templates) and emulates different lens/projection types (e.g., fisheye, wide-angle, cubemap, equirectangular, etc.). Playback module 1208 also permits granular control of the projections, including playback, scale, rotation, translation, brightness, and color of media.

Lighting simulation module 1210 simulates the actual lighting of the media surfaces (e.g., display screens) based on the venue's panel type, layout, and size. As such, lighting simulation module 1210 can visualize different lighting (e.g., LED) pitches, for example, by using custom GPU accelerated shaders to treat close and far distances differently by providing various levels of detail. For example, a close distance would simulate individual pixels, and a far distance would simulate the light-converging.

Along these lines, lighting simulation module 1210 can simulate various lighting modes inside of the venue including based on the LED media surface, lighting, media plane total brightness, effects of lighting on architecture, and effects of lighting on the user's point of view, and the effects of various material properties on perceived lighting.

Control module 1212 allows for the control of the simulation by a single user or multiple users to allow most or all options of the system to be manipulated through a local or external user interface to assist and control the simulation of the venue. Additionally, control module 1212 permits multiple users in the same or different instances of the simulation to interact and review media content together.

Navigation module 1214 allows users to move to different viewer locations in the venue to receive a hint of how the presentation may be presented. Navigation module 1214 may provide preselected points of view, point and shoot teleporting, point and snap to seat teleporting, directional incremental seat movement, free roam teleporting abilities, and interactive mini-maps.

AR module 1216 generates a field of vision that would be provided by specific AR user devices for various viewer locations in the venue. For example, the Microsoft Hololens AR device may provide a unique field of vision for a specific viewer location in the venue. As such, the AR module 1216 generates the unique field of vision that would be provided by the Microsoft Hololens AR device for the specific view location in the venue.

AR module 1216 may also provide the various capability of different AR user devices. For example, AR user devices provide different types of spatial and content tracking systems, degrees of freedom (e.g., three degrees of freedom versus six degrees of freedom), and latency. As such, AR module 1216 replicates the feel and look of different AR user devices, for example, by mirroring their spatial and content tracking, degrees of freedom, and latency. Further, AR module 1216 may simulate future AR devices to concept and review content for such devices.

Asset system 1218 allows users to import and load static or animated three- or two-dimensional assets from either a curated library or custom files in a format that can be easily placed and/or transformed (e.g., translation, rotation, scale) anywhere inside the venue. Further, the assets may permit animation and custom programming. This provides users with an understanding of the effect that the venue architecture and spherical media planes have on the media content, as well as on the layout of the media content on the media surfaces and the occlusion of the media content from different viewpoints in the venue. This also allows users to compare representative media content for possible show types.

Audio system 1220 simulates various mono, stereo, ambisonic, and/or programmable point sources of audio to evaluate and/or review mixes inside of a simulation of the venue. Audio system 1220 may also simulate how audio interacts with various materials and architecture inside of the venue. Audio system 1220 generated audio may be programmed and/or animated, as well as exported for use in other audio systems.

API 1222 allows for an external or internal program or subroutine to control all aspects of the simulation for coordination or control of the experience.

Animation System 1224 allows users to control, record, and/or playback audio, media content, and/or two- or three-dimensional assets through the use of a timeline and/or an event system. Thus, animation system 1224 allows users to create an experience inside of the venue simulation, such as the ability to orchestrate external APIs and systems that work in unison with the simulation to show you the possibilities of a show. This data can further be exported to other external programs for further editing and playback.

Figure 13:
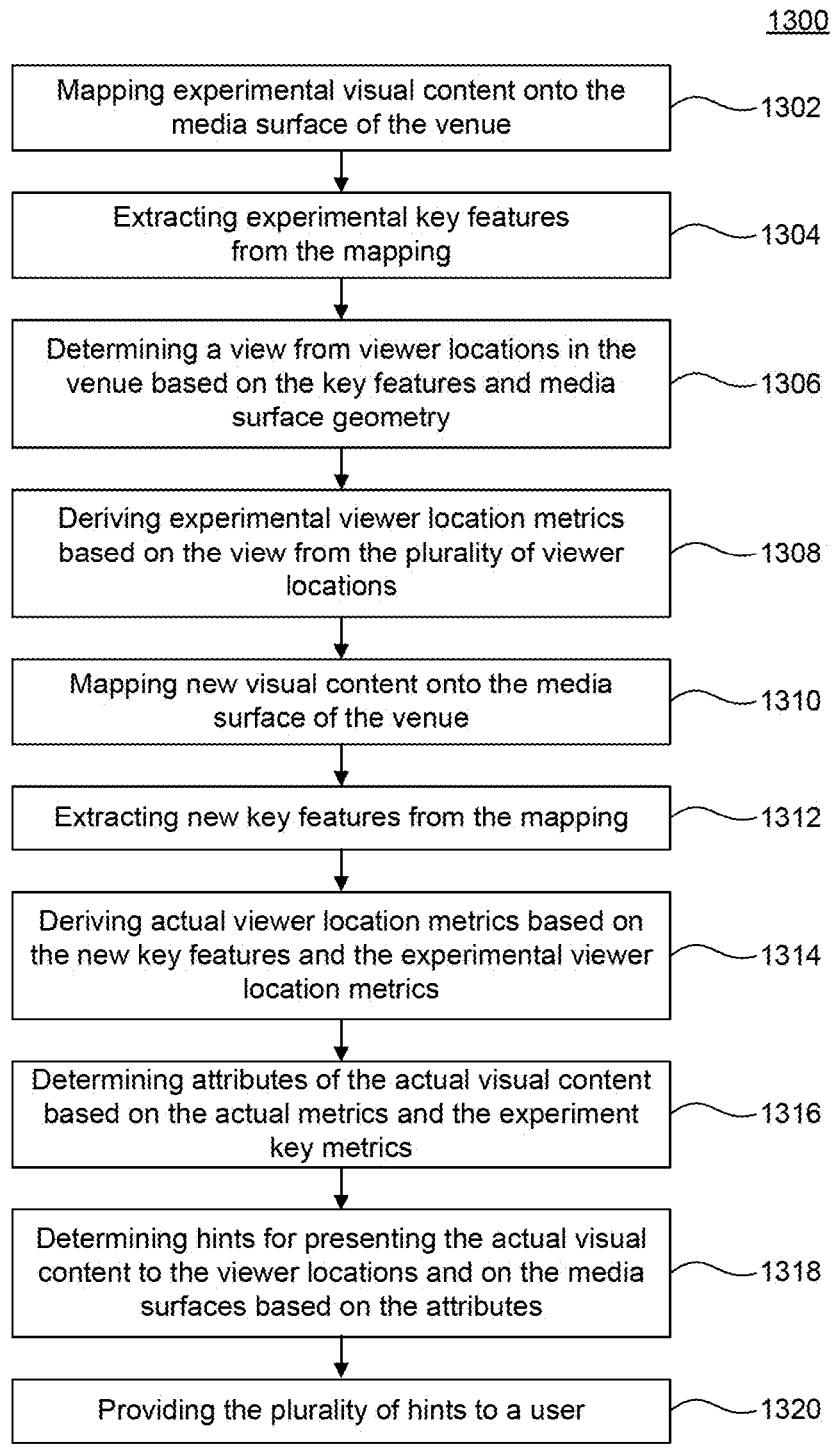
Figure 14:
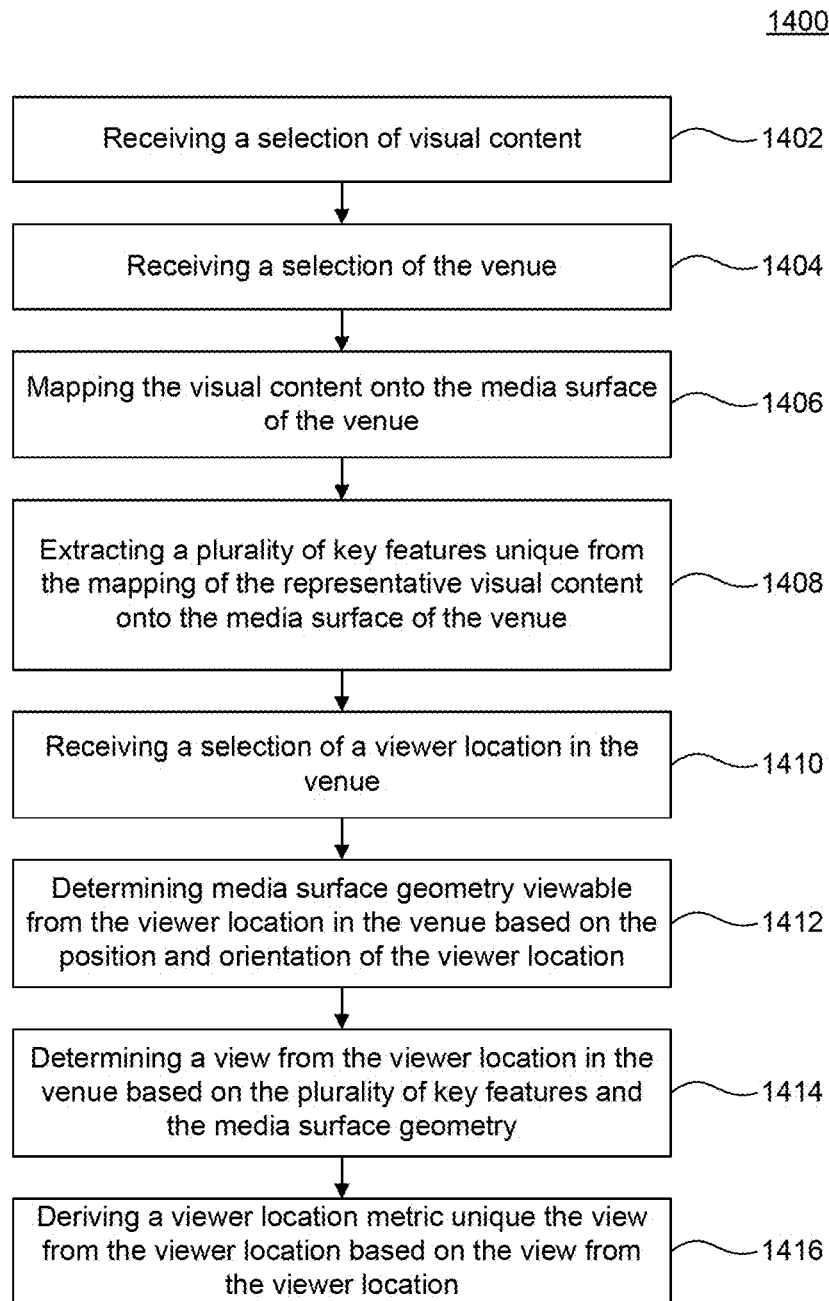
Figure 15:
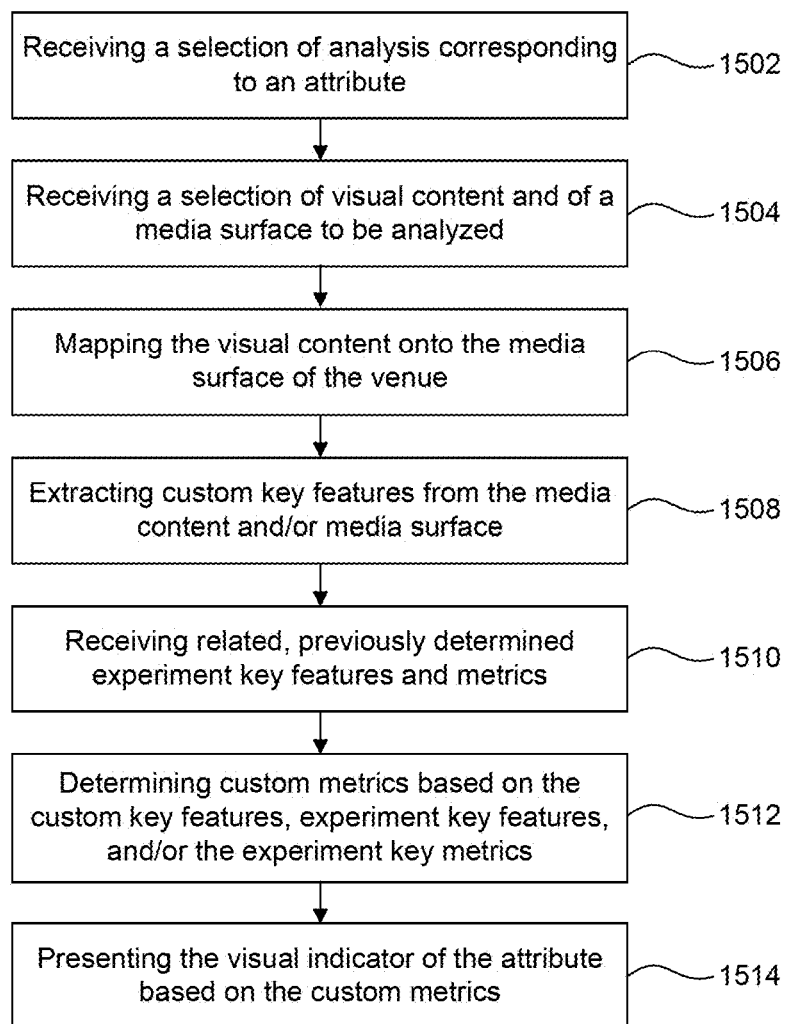

FIG. 13 is a flowchart for a method 1300 for providing visual guidance on presenting content on a media surface of a venue, according to some embodiments. FIG. 14 is a flowchart for a method 1400 for deriving a metric for determining an attribute of a venue and/or a media content mapped onto a media surface of the venue, according to some embodiments. FIG. 15 is a flowchart for a method 1500 for determining an attribute of one or both of a venue and a media content mapped onto a media surface of the venue, according to some embodiments. Methods 1300/1400/1500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 3, as will be understood by a person of ordinary skill in the art.

Referring now to FIG. 13, method 1300 shall be described with reference to FIGS. 1-3. However, method 1300 is not limited to those example embodiments.

In 1302, the central server 102 maps experiment media content onto the media surface 202 of the venue 200. As in 302, prior to the mapping, an experiment may be selected by a user for deriving various features of the venue (e.g., distortion, view quality, distance, and media surface visibility) and their corresponding metrics.

In 1304, the central server 102 extract experiment key features from the mapping of the experiment media content onto the media surface 202 of the venue 200.

In 1306, the central server 102 determines a view for viewer locations 206A-D in the venue 200 based on the experiment key features and media surface geometry. In some embodiments, as in 418 to 424, the central server may determine if there are a plurality of groups of viewer locations 206A-D. And, then, for each group, sequentially determine for the view for the viewer locations 206A-D.

In 1308, the central server 102 derives experiment metrics based on the view from the plurality of viewer locations 206A-D. As in 430 to 434, the experiment metrics may be derived for each viewer location 206A-D, and each group viewer locations 206A-D.

In 1310, the central server 102 maps actual visual content onto the media surface 202 of the venue 200. The actual visual content is different from the experiment visual content.

In 1312, the central server 102 extracts actual key features from the mapping of the actual visual content onto the media surface 202 of the venue 200. The actual key features are different from the experiment key features.

In 1314, the central server 102 derives actual viewer location metrics based on the actual key features and the experiment metrics.

In 1316, the central server 102 determines attributes of the actual visual content based on the actual metrics and the experiment key metrics.

In 1318, the central server 102 determines hints for presenting the actual visual content to the viewer locations and on the media surfaces based on the attributes.

In 1320, the central server 102 provides the hints to a user.

Referring now to FIG. 14, method 1400 shall be described with reference to FIGS. 1, 2, and 4. However, method 1400 is not limited to these example embodiments.

In 1402, the central server 102 receives a selection of visual content.

In 1404, the central server 102 receives a selection of the venue 200. The venue 200 having a media surface 202, a stage 204, and a plurality of viewer locations 206A-E (e.g., seats and standing locations).

In 1406, the central server 102 maps the visual content onto the media surface 202 of the venue 200.

In 1408, the central server 102 extracts key features unique from the media surface 202 and/or the visual content mapped onto the media surface 202.

In 1410, the central server 102 receives a selection of a viewer location in the venue 200, which includes at least a position and orientation of the viewer location relative to the media surface 202 of the venue 200. In some embodiments, as in 418, the central server 102 receives a selection of a group of viewer locations 206A-D (e.g., a section or level) in the venue 200.

In 1412, the central server 102 determines media surface geometry viewable from the viewer location in the venue 200 based on the position and orientation of the viewer location in the venue 200. Accordingly, if a group of viewer locations is selected as in 420, one of the viewer locations in the group is selected as in 422.

In 1414, the central server 102 determines a view from the viewer location in the venue based on the extracted key features and the media surface geometry.

In 1416, the central server 102 determines viewer location metrics unique to the view from the viewer location.

As described above, as in 418, the central server 102 may receive a selection of a group of viewer locations. Accordingly, once a first viewer location is processed in 420-434, the next viewer locations may be processed in 420-434, and their respective viewer location metrics may be derived. Moreover, group viewer location metrics representing the entire group of viewer locations may be derived based on the individual viewer location metrics.

Referring now to FIG. 15, method 1500 shall be described with reference to FIGS. 1, 6, 7, and 9-11. However, method 1500 is not limited to those example embodiments.

In 1502, the central server 102 receiving a selection of analysis corresponding to an attribute from user device 106A-B.

In 1504, the central server 102 receives a selection of visual content and of media surface to be analyzed from user device 106A-B.

The selection of the analysis, visual content, and/or media surface may be provided on user interface 700.

In 1506, the central server 102 maps the visual content onto the media surface of the venue.

In 1508, the central server 102 extracts custom key features from the media content and/or media surface.

In 1510, the central server 102 receives related, previously determined experiment key features and metrics from storage 612.

In 1512, the central server 102 receives related, previously determined experiment key features and metrics.

In 1514, the central server 102 determines custom metrics based on the custom key features, experiment key features, and/or the experiment metrics. As described with respect to 614, 616, 620, and 622, custom metrics may be derived for viewer location groups and/or for media the media surface.

In 1516, the central server 102 presents the visual indicator of the attribute based on the custom metrics. In some embodiments, the visual guidance may be provided as a heat map. If the custom metrics are derived for the viewer location groups, the heat map may be of the viewer locations as illustrated in FIG. 9. If the custom metrics are derived for the media surface, the heat map may be of the media surface, as illustrated in FIGS. 10A-C. Moreover, in some embodiment, the visual guidance may of a sample view of the media content from the viewer location, as illustrated in FIG. 11.

Figure 16:
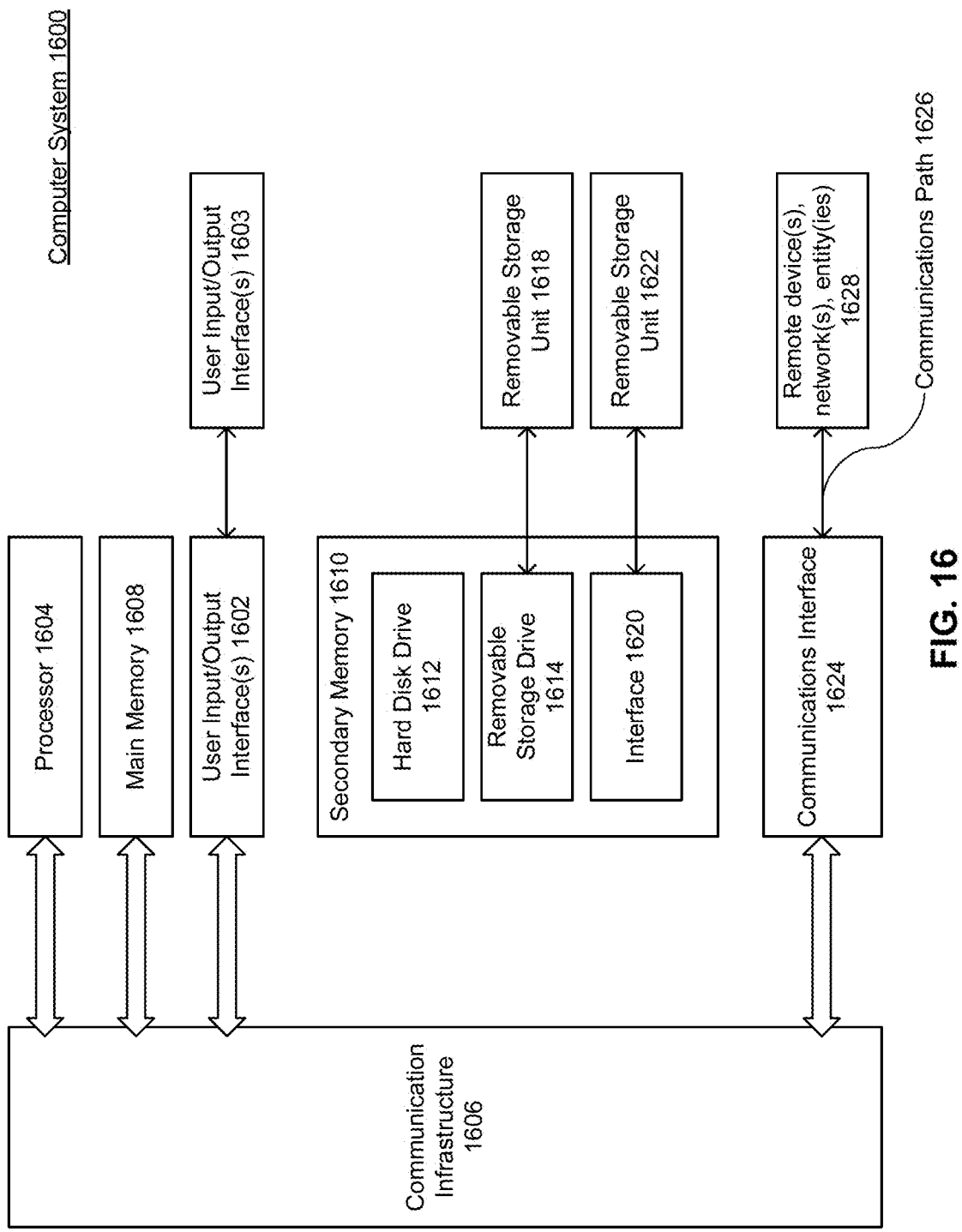
FIG. 16 illustrates an example computer system useful for implementing various embodiments.

Various embodiments may be implemented, for example, using one or more well-known computer systems, such as computer system 1600 shown in FIG. 16. One or more computer systems 1600 may be used, for example, to implement any of the embodiments discussed herein, as well as combinations and sub-combinations thereof.

Computer system 1600 may include one or more processors (also called central processing units, or CPUs), such as a processor 1604. Processor 1604 may be connected to a communication infrastructure or bus 1606.

Computer system 1600 may also include user input/output device(s) 1603, such as monitors, keyboards, pointing devices, etc., which may communicate with communication infrastructure or bus 1606 through user input/output interface(s) 1602.

One or more processors 1604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1600 may also include a main or primary memory 1608, such as random access memory (RAM). Main memory 1608 may include one or more levels of cache. Main memory 1608 may have stored therein control logic (i.e., computer software) and/or data.

Computer system 1600 may also include one or more secondary storage devices or memory 1610. Secondary memory 1610 may include, for example, a hard disk drive 1612 and/or a removable storage device or drive 1614. Removable storage drive 1614 may be a floppy disk drive, a magnetic tape drive, a compact disk drive, an optical storage device, tape backup device, and/or any other storage device/drive.

Removable storage drive 1614 may interact with a removable storage unit 1618. Removable storage unit 1618 may include a computer-usable or readable storage device having stored thereon computer software (control logic) and/or data. Removable storage unit 1618 may be a floppy disk, magnetic tape, compact disk, DVD, optical storage disk, and any other computer data storage device. Removable storage drive 1614 may read from and/or write to removable storage unit 1618.

Secondary memory 1610 may include other means, devices, components, instrumentalities, or other approaches for allowing computer programs and/or other instructions and/or data to be accessed by computer system 1600. Such means, devices, components, instrumentalities, or other approaches may include, for example, a removable storage unit 1622 and an interface 1620. Examples of the removable storage unit 1622 and the interface 1620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1600 may further include a communication or network interface 1624. Communication interface 1624 may enable computer system 1600 to communicate and interact with any combination of external devices, external networks, external entities, etc. (individually and collectively referenced by reference number 1628). For example, communication interface 1624 may allow computer system 1600 to communicate with external or remote devices 1628 over communications path 1626, which may be wired and/or wireless (or a combination thereof), and which may include any combination of LANs, WANs, the Internet, etc. Control logic and/or data may be transmitted to and from computer system 1600 via communication path 1626.

Computer system 1600 may also be any of a personal digital assistant (PDA), desktop workstation, laptop or notebook computer, netbook, tablet, smart-phone, a virtual/mixed/augmented reality device, smart-watch or other wearable, appliance, part of the Internet-of-Things, and/or embedded system, to name a few non-limiting examples, or any combination thereof.

Computer system 1600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1600, main memory 1608, secondary memory 1610, and removable storage units 1618 and 1622, as well as tangible articles of manufacture embodying any combination of the foregoing. Such control logic, when executed by one or more data processing devices (such as computer system 1600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 16. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for previewing visual content on a media surface in a venue from a viewer location in the venue, the method comprising:

providing, by a processor, a viewer location heat map that was generated based on a plurality of viewer location attribute values of a plurality of views of the visual content on the media surface, the viewer location heat map graphically identifying a plurality of groups of viewer locations from among a plurality of viewer locations in the venue, the plurality of groups of viewer locations being assigned to a plurality of ranges of viewer location attribute values from among the plurality of viewer location attribute values;

receiving, by the processor, a selection of a group of viewer locations having the viewer location from among the plurality of groups of viewer locations from the viewer location heat map, the viewer location having a viewer location attribute value within a range of viewer location attribute values from among the plurality of viewer location attribute values that is assigned to the group of viewer locations;

rendering, by the processor, an image of the visual content on the media surface in the venue from a point of view of the group of viewer locations selected by a user; and overlaying, by the processor, a media surface heat map on the image of the visual content on the media surface, the media surface heat map corresponding to a plurality of regions on the media surface that are assigned to media surface attribute ranges from among a plurality of media surface attribute ranges, the plurality of regions on the media surface being defined based on portions of the media surface that correspond to media surface attribute values that fall within the media surface attribute ranges from among the plurality of media surface attribute ranges that are assigned to the plurality of regions.

2. The method of claim 1, further comprising:

receiving, by the processor, a selection by the user of the visual content; and receiving, by the processor, a selection by the user of the venue, and wherein the providing comprises:

providing the viewer location heat map that was generated based further on the visual content and the venue.

3. The method of claim 1, wherein the viewer location heat map comprises a plurality of colors that were assigned to the plurality of groups of viewer locations in the viewer location heat map based on ranges of viewer location attribute values from among the plurality of viewer location attribute values that are assigned to the plurality of groups of viewer locations.

4. The method of claim 1, further comprising receiving, by the processor, a selection of the viewer location attribute value from the user, and wherein the viewer location attribute value is selected from a group consisting of:

a degree of a field of view of the media surface from the viewer location, a distance to a portion of the media surface from the viewer location, an amount of a field of view of the media surface occluded by venue structure or viewer location geometry from the viewer location, an amount of the visual content viewable on the media surface from the viewer location, an amount of the media surface viewable from the viewer location, and a degree of distortion of the visual content from the viewer location.

5. The method of claim 1, wherein the overlaying comprises assigning the plurality of regions on the media surface to a plurality of colors or shading.

6. The method of claim 1, further comprising:

receiving, by the processor, a selection by the user of a second group of viewer locations from among the plurality of groups of viewer locations from the viewer location heat map;

rendering, by the processor, a second image of the visual content on the media surface in the venue from a second point of view of the second group of viewer locations selected by the user; and overlaying, by the processor, the media surface heat map on the second image of the visual content on the media surface.

7. The method of claim 1, wherein the overlaying comprises overlaying the media surface heat map that corresponds to the point of view of the group of viewer locations selected by the user on the image of the visual content on the media surface.

8. A system for previewing visual content on a media surface in a venue from a viewer location in the venue, the system comprising:

a memory configured to store a viewer location heat map that was generated based on a plurality of viewer location attribute values of a plurality of views of the visual content on the media surface, the viewer location heat map graphically identifying a plurality of groups of viewer locations from among a plurality of viewer locations in the venue, the plurality of groups of viewer locations being assigned to a plurality of ranges of viewer location attribute values from among the plurality of viewer location attribute values; and a processor configured to execute instructions stored in the memory, the instructions, when executed by the processor, configuring the processor to:

receive a selection of a group of viewer locations having the viewer location from among the plurality of groups of viewer locations from the viewer location heat map, the viewer location having a viewer location attribute value within a range of viewer location attribute values from among the plurality of viewer location attribute values that is assigned to the group of viewer locations, render an image of the visual content on the media surface in the venue from a point of view of the group of viewer locations selected by a user, and overlay a media surface heat map on the image of the visual content on the media surface, the media surface heat map corresponding to a plurality of regions on the media surface that are assigned to media surface attribute ranges from among a plurality of media surface attribute ranges, the plurality of regions on the media surface being defined based on portions of the media surface that correspond to media surface attribute values that fall within the media surface attribute ranges from among the plurality of media surface attribute ranges that are assigned to the plurality of regions.

9. The system of claim 8, wherein the instructions, when executed by the processor, further configure the processor to:

receive a selection by the user of the visual content; and receive a selection by the user of the venue, and wherein the memory is further configured to store the viewer location heat map that was generated based further on the visual content and the venue.

10. The system of claim 8, wherein the viewer location heat map comprises a plurality of colors that were assigned to the plurality of groups of viewer locations in the viewer location heat map based on ranges of viewer location attribute values from among the plurality of viewer location attribute values that are assigned to the plurality of groups of viewer locations.

11. The system of claim 8, wherein the instructions, when executed by the processor, further configure the processor to receive a selection of the viewer location attribute value from the user, and
wherein the viewer location attribute value is selected from a group consisting of:
a degree of a field of view of the media surface from the viewer location, a distance to a portion of the media surface from the viewer location, an amount of a field of view of the media surface occluded by venue structure or viewer location geometry from the viewer location, an amount of the visual content viewable on the media surface from the viewer location, an amount of the media surface viewable from the viewer location, and a degree of distortion of the visual content from the viewer location.

12. The system of claim 8, wherein the instructions, when executed by the processor, configure the processor to assign the plurality of regions on the media surface to a plurality of colors or shading.

13. The system of claim 8, wherein the instructions, when executed by the processor, further configure the processor to:
receive a selection by the user of a second group of viewer locations from among the plurality of groups of viewer locations from the viewer location heat map;
render a second image of the visual content on the media surface in the venue from a second point of view of the second group of viewer locations selected by the user; and
overlay the media surface heat map on the second image of the visual content on the media surface.

14. The system of claim 8, wherein the instructions, when executed by the processor, configure the processor to overlay the media surface heat map that corresponds to the point of view of the group of viewer locations selected by the user on the image of the visual content on the media surface.

15. A system for previewing visual content on a media surface in a venue from a viewer location in the venue, the system comprising:
a processor configured to:
access a viewer location heat map that was generated based on a plurality of viewer location attribute values of a plurality of views of the visual content on the media surface, the viewer location heat map graphically identifying a plurality of groups of viewer locations from among a plurality of viewer locations in the venue, the plurality of groups of viewer locations being assigned to a plurality of ranges of viewer location attribute values from among the plurality of viewer location attribute values,
receive a selection of a group of viewer locations having the viewer location from among the plurality of groups of viewer locations from the viewer location heat map, the viewer location having a viewer location attribute value within a range of viewer location attribute values from among the plurality of viewer location attribute values that is assigned to the group of viewer locations,
render an image of the visual content on the media surface in the venue from a point of view of the group of viewer locations selected by a user, and
overlay a media surface heat map on the image of the visual content on the media surface, the media surface heat map corresponding to a plurality of regions on the media surface that are assigned to media surface attribute ranges from among a plurality of media surface attribute ranges, the plurality of regions on the media surface being defined based on portions of the media surface that correspond to media surface attribute values that fall within the media surface attribute ranges from among the plurality of media surface attribute ranges that are assigned to the plurality of regions; and
a display configured to display the image of the visual content that is overlaid with the media surface heat map to the user.

16. The system of claim 15, wherein the processor is further configured to:
receive a selection by the user of the visual content;
receive a selection by the user of the venue; and
access a viewer location heat map that was generated based further on the visual content and the venue.

17. The system of claim 15, wherein the viewer location heat map comprises a plurality of colors that were assigned to the plurality of groups of viewer locations in the viewer location heat map based on ranges of viewer location attribute values from among the plurality of viewer location attribute values that are assigned to the plurality of groups of viewer locations.

18. The system of claim 15, wherein the processor is further configured to receive a selection of the viewer location attribute value from the user, and
wherein the viewer location attribute value is selected from a group consisting of:
a degree of a field of view of the media surface from the viewer location, a distance to a portion of the media surface from the viewer location, an amount of a field of view of the media surface occluded by venue structure or viewer location geometry from the viewer location, an amount of the visual content viewable on the media surface from the viewer location, an amount of the media surface viewable from the viewer location, and a degree of distortion of the visual content from the viewer location.

19. The system of claim 15, wherein the processor is configured to assign the plurality of regions on the media surface to a plurality of colors or shading.

20. The system of claim 15, wherein the processor is configured to overlay the media surface heat map that corresponds to the point of view of the group of viewer locations selected by the user on the image of the visual content on the media surface.

* * * * *